(12) United States Patent
Hong et al.

(10) Patent No.: US 9,497,666 B2
(45) Date of Patent: Nov. 15, 2016

(54) METHOD FOR HANDOVER IN ENVIRONMENT CONNECTED TO MULTIPLE BASE STATIONS AND APPARATUS THEREFOR

(71) Applicant: KT CORPORATION, Gyeonggi-do (KR)

(72) Inventors: Sung-pyo Hong, Seoul (KR); KyungJun Lee, Seoul (KR)

(73) Assignee: KT CORPORATION, Gyeonggi-do (KR)

( * ) Notice: Subject to any disclaimer, the term of this patent is extended or adjusted under 35 U.S.C. 154(b) by 0 days.

(21) Appl. No.: 14/779,957

(22) PCT Filed: Mar. 24, 2014

(86) PCT No.: PCT/KR2014/002449
§ 371 (c)(1),
(2) Date: Sep. 24, 2015

(87) PCT Pub. No.: WO2014/157888
PCT Pub. Date: Oct. 2, 2014

(65) Prior Publication Data
US 2016/0057660 A1     Feb. 25, 2016

(30) Foreign Application Priority Data

Mar. 29, 2013 (KR) .................. 10-2013-0034603
Nov. 12, 2013 (KR) .................. 10-2013-0136724

(51) Int. Cl.
*H04W 36/00* (2009.01)
*H04W 76/02* (2009.01)
*H04W 36/04* (2009.01)

(52) U.S. Cl.
CPC ..... *H04W 36/0016* (2013.01); *H04W 36/0072* (2013.01); *H04W 76/025* (2013.01); *H04W 36/04* (2013.01)

(58) Field of Classification Search
CPC ............... H04W 36/0016; H04W 36/0072; H04W 48/18; H04W 88/06; H04M 1/00; H04M 3/00
See application file for complete search history.

(56) References Cited

U.S. PATENT DOCUMENTS

2010/0227617 A1   9/2010   Jung et al.
2012/0314606 A1   12/2012   Takano
(Continued)

FOREIGN PATENT DOCUMENTS

| KR | 10-2008-0016024 A | 2/2008 |
|---|---|---|
| KR | 10-2013-0003016 A | 1/2013 |
| KR | 10-2013-0030738 A | 3/2013 |

OTHER PUBLICATIONS

ETSI TS 136 331 V10.1.0 (Apr. 2011).*
(Continued)

*Primary Examiner* — Chuong A Ngo
(74) *Attorney, Agent, or Firm* — IP Legal Services, LLC

(57) ABSTRACT

The present disclosure relates to a handover technique, for supporting mobility of a terminal configuring a dual connectivity with multiple base stations in a small cell environment. More specifically, the present disclosure provides a method for controlling handover of a terminal, by a first base station configuring a dual connectivity with the terminal. The method may include determining handover of the terminal, transmitting, to a target base station, handover preparation information including radio resource configuration information of a cell associated with a second base station, receiving, from the target base station, a handover message including radio resource configuration information of a cell associated with the target base station, and transmitting an upper layer message included in the handover message to the terminal.

14 Claims, 19 Drawing Sheets

(56) References Cited

U.S. PATENT DOCUMENTS

| | | |
|---|---|---|
| 2013/0022023 A1 | 1/2013 | Aydin |
| 2013/0028117 A1 | 1/2013 | Montojo et al. |
| 2013/0072192 A1 | 3/2013 | Xu et al. |
| 2014/0179320 A1* | 6/2014 | Jang ..................... H04W 36/30 455/436 |
| 2014/0370897 A1* | 12/2014 | Vesterinen ............ H04W 36/08 455/436 |

OTHER PUBLICATIONS

V. Srinivasa Rao et al., "Interoperable UE Handovers in LTE", Radisys White Paper, Sep. 2011, pp. 1-11, Radisys Corporation, OR, U.S.A.

* cited by examiner

FIG.6    HANDOVERPREPARATIONINFORMATION MESSAGE

```
HandoverPreparationInformation ::=SEQUENCE {
    criticalExtensions             CHOICE {
        c1                              CHOICE{
            handoverPreparationInformation-r8  HandoverPreparationInformation-r8-IEs,
            spare7 NULL,
            spare6 NULL, spare5 NULL, spare4 NULL,
            spare3 NULL, spare2 NULL, spare1 NULL
        },
        criticalExtensionsFuture        SEQUENCE {}
    }
}

HandoverPreparationInformation-r8-IEs ::= SEQUENCE {
    ue-RadioAccessCapabilityInfo   UE-CapabilityRAT-ContainerList,
    as-Config                      AS-Config        OPTIONAL,   -- Cond HO
    rrm-Config                     RRM-Config       OPTIONAL,
    as-Context                     AS-Context       OPTIONAL,   -- Cond HO
    nonCriticalExtension           HandoverPreparationInformation-v920-IEs  OPTIONAL
}

-THE REST IS OMITTED-
--ASN1STOP
```

FIG.7    AS-CONFIG INFORMATION ELEMENT

```
-- ASN1START

AS-Config ::=          SEQUENCE {
    sourceMeasConfig                    MeasConfig,
    sourceRadioResourceConfig           RadioResourceConfigDedicated,
    sourceSecurityAlgorithmConfig       SecurityAlgorithmConfig,
    sourceUE-Identity                   C-RNTI,
    sourceMasterInformationBlock        MasterInformationBlock,
    sourceSystemInformationBlockType1   SystemInformationBlockType1(WITH COMPONENTS
                                            {..., nonCriticalExtension ABSENT}),
    sourceSystemInformationBlockType2   SystemInformationBlockType2,
    antennaInfoCommon                   AntennaInfoCommon,
    sourceDl-CarrierFreq                ARFCN-ValueEUTRA,
    ...,
    [[ sourceSystemInformationBlockTypeExt   OCTET STRING (CONTAINING
                                                 SystemInformationBlockType1-v890-Ies) OPTIONAL,
       sourceOtherConfig-r9                  OtherConfig-r9
    ]],
    [[ sourceSCellConfigList-r10             SCellToAddModList-r10                  OPTIONAL
    ]]
}
-- THE REST IS OMITTED-
-- ASN1STOP
```

FIG.8  AS-CONFIG INFORMATION ELEMENT

```
--ASN1START

AS-Config ::=        SEQUENCE {
    sourceMeasConfig              MeasConfig,
    sourcePCellRadioResourceConfig  RadioResourceConfigDedicated,   -- 801
    sourceSCellRadioResourceConfig  RadioResourceConfigDedicated,   -- 805
    sourceSecurityAlgorithmConfig   SecurityAlgorithmConfig,
    sourceUE-Identity               C-RNTI,
    sourceMasterInformationBlock    MasterInformationBlock,
    sourceSystemInformationBlockType1  SystemInformationBlockType1(WITH COMPONENTS
                                    {..., nonCriticalExtension ABSENT}),
    sourceSystemInformationBlockType2  SystemInformationBlockType2,
    antennaInfoCommon               AntennaInfoCommon,
    sourceDl-CarrierFreq            ARFCN-ValueEUTRA,
    ...,
    [[ sourceSystemInformationBlockTypeExt   OCTET STRING (CONTAINING
                                            SystemInformationBlockType1-v890-Ies) OPTIONAL,
       sourceOtherConfig-r9         OtherConfig-r9
    ]],
    [[ sourceSCellConfigList-r10    SCellToAddModList-r10    OPTIONAL    -- 810
    ]]
}
--THE REST IS OMITTED--
--ASN1STOP
```

FIG. 9    AS-CONFIG INFORMATION ELEMENT

```
-- ASN1START

AS-Config ::=        SEQUENCE {
    sourceMeasConfig                    MeasConfig,
    sourceRadioResourceConfig           RadioResourceConfigDedicated,
    sourceSecurityAlgorithmConfig       SecurityAlgorithmConfig,
    sourceUE-Identity                   C-RNTI,
    sourceMasterInformationBlock        MasterInformationBlock,
    sourceSystemInformationBlockType1   SystemInformationBlockType1(WITH COMPONENTS
                                        {..., nonCriticalExtension ABSENT}),
    sourceSystemInformationBlockType2   SystemInformationBlockType2,
    antennaInfoCommon                   AntennaInfoCommon,
    sourceDl-CarrierFreq                ARFCN-ValueEUTRA,
    ...,
    [[ sourceSystemInformationBlockType1Ext   OCTET STRING (CONTAINING
                                              SystemInformationBlockType1-v890-Ies) OPTIONAL,
       sourceOtherConfig-r9             OtherConfig-r9
    ]],
    [[ sourceSCellConfigList-r10        SCellToAddModList-r10                      OPTIONAL
    ]],
    [[ sourceSCellConfig-r12            RadioResourceConfigDedicated               OPTIONAL
    ]]
}
-- THE REST IS OMITTED --
-- ASN1STOP
```

AS-CONFIG INFORMATION ELEMENT

```
-- ASN1START

AS-Config ::=          SEQUENCE {
    sourceMeasConfig               MeasConfig,
    sourcePCellRadioResourceConfig RadioResourceConfigDedicated,         -- 1001
    sourceSCellRadioResourceConfig RadioResourceConfigDedicatedSCell,    -- 1005
    sourceSecurityAlgorithmConfig  SecurityAlgorithmConfig,
    sourceUE-Identity              C-RNTI,
    sourceMasterInformationBlock   MasterInformationBlock,
    sourceSystemInformationBlockType1 SystemInformationBlockType1(WITH COMPONENTS
                                      {..., nonCriticalExtension ABSENT}),
    sourceSystemInformationBlockType2 SystemInformationBlockType2,
    antennaInfoCommon                 AntennaInfoCommon,
    sourceDl-CarrierFreq              ARFCN-ValueEUTRA,
    ...,
    [[ sourceSystemInformationBlockType1Ext  OCTET STRING (CONTAINING
                                             SystemInformationBlockType1-v890-Ies) OPTIONAL,
       sourceOtherConfig-r9             OtherConfig-r9
    ]],
    [[ sourceSCellConfigList-r10     SCellToAddModList-r10     OPTIONAL    -- 1010
    ]]
}
-- THE REST IS OMITTED-
-- ASN1STOP
```

FIG.11    AS-CONFIG INFORMATION ELEMENT

```
--ASN1START

AS-Config  ::=    SEQUENCE {
    sourceMeasConfig              MeasConfig,
    sourceRadioResourceConfig     RadioResourceConfigDedicated,
    sourceSecurityAlgorithmConfig SecurityAlgorithmConfig,
    sourceUE-Identity             C-RNTI,
    sourceMasterInformationBlock  MasterInformationBlock,
    sourceSystemInformationBlockType1 SystemInformationBlockType1(WITH COMPONENTS
                                      {..., nonCriticalExtension ABSENT}),
    sourceSystemInformationBlockType2 SystemInformationBlockType2,
    antennaInfoCommon             AntennaInfoCommon,
    sourceDl-CarrierFreq          ARFCN-ValueEUTRA,
    ...,
    [[ sourceSystemInformationBlockTypelExt    OCTET STRING (CONTAINING
                                               SystemInformationBlockType1-v890-Ies) OPTIONAL,
        sourceOtherConfig-r9      OtherConfig-r9
    ]],
    [[ sourceSCellConfigList-r10  SCellToAddModList-r10                         OPTIONAL
    ]],
    [[ sourceSCellConfig-r12      RadioResourceConfigDedicatedSCell  OPTIONAL
    ]]
}
--THE REST IS OMITTED--
--ASN1STOP
```

CANDIDATECELLINFOLIST-R10 OF RRM-CONFIG INFORMATION ELEMENT

```
-- ASN1START

CandidateCellInfoList-r10 ::= SEQUENCE (SIZE (1..maxFreq)) OF CandidateCellInfo-r10

CandidateCellInfo-r10 ::=      SEQUENCE {
    -- cellIdentification
    physCellId-r10                 PhysCellId,
    dl-CarrierFreq-r10             ARFCN-ValueEUTRA,
    -- available measurement results
    rsrpResult-r10                 RSRP-Range          OPTIONAL,
    rsrqResult-r10                 RSRQ-Range          OPTIONAL,
    ...
}
-- ASN1STOP
```

METHOD FOR HANDOVER IN ENVIRONMENT CONNECTED TO MULTIPLE BASE STATIONS AND APPARATUS THEREFOR

CROSS REFERENCE TO RELATED APPLICATIONS

This application is a National Stage Patent Application of PCT International Patent Application No. PCT/KR2014/002449 (filed on Mar. 24, 2014) under 35 U.S.C. §371, which claims priority to Korean Patent Application Nos. 10-2013-0034603 (filed on Mar. 29, 2013) and 10-2013-0136724 (filed on Nov. 12, 2013), the teachings of which are incorporated herein in their entireties by reference.

TECHNICAL FIELD

The present disclosure relates to a handover technology, and more particularly, to a handover technology for supporting the mobility of a User Equipment (UE) that configures dual connectivity with a plurality of Base Stations (BSs) in a small cell environment.

BACKGROUND ART

Due to advances in communication systems, various wireless terminals have been introduced to consumers, such as companies and individuals.

A current mobile communication system has been affiliated with 3GPP, for example, Long Term Evolution (LTE), LTE-Advanced, and the like. Such a mobile communication systems are capable of transmitting and receiving a large amount of data at a high speed. Furthermore, the mobile communication systems are capable of transmitting, receiving, and processing various types of data, such as multimedia data, radio signal, and the like, as well as a voice data.

Accordingly, there is a desire for technology that extends the capacity of a User Equipment (UE) by utilizing small cells for the high speed and high capacity communication system.

In this instance, a UE may configure dual connectivity with a BS that provides a macro cell and a BS that provides a small cell, so as to transmit or receive data. The UE may configure at least one bearer with each BS.

The handover technology is an essential technology for supporting the mobility of a UE, and the handover technology is important to providing seamless communication services along the movement of the UE.

Therefore, a handover procedure for supporting the mobility is required even in the small cell environment that may be configured in response to the demand for the high speed and high capacity communication system.

DETAILED DESCRIPTION OF THE INVENTION

Technical Problem

By demand, the present disclosure provides a method and apparatus for a User Equipment (UE) configuring dual connectivity with a plurality of Base Stations (BSs) to process a radio bearer configured in a small cell upon the execution of handover.

Also, the present disclosure provides a method and apparatus for the UE to reconfigure, through a target BS, a radio bearer that was configured through dual connectivity with a small cell, so as to use the reconfigured radio bearer, even after executing handover.

Technical Solution

In accordance with an aspect of the present disclosure, there is provided a method of a first Base Station (BS) configuring dual connectivity with a User Equipment (UE) for controlling handover of the UE. The method may include determining handover of the UE, transmitting, to a target BS, handover preparation information including radio resource configuration information of a cell associated with a second BS, receiving, from the target BS, a handover message including radio resource configuration information of a cell associated with the target BS, and transmitting, to the UE, a higher layer message included in the handover message.

In accordance with another aspect of the present disclosure, there is provided a method of a UE configuring dual connectivity with a first BS and a second BS for performing handover. The method may include receiving, from the first BS, a higher layer message for handover, configuring a radio bearer of a cell associated with a target BS, based on the higher layer message for handover, and accessing the target BS through random access, and transmitting, to the target BS, a higher layer signaling including handover complete information.

In accordance with another aspect of the present disclosure, there is provided a first BS for controlling handover of a UE that configures dual connectivity with a second BS. The BS may include a controller, a receiving unit, and a transmitting unit. The controller may be configured to determine handover of the UE, a transmitting unit to transmit, to a target BS, handover preparation information including radio resource configuration information of a cell associated with a second BS. The receiving unit may be to receive, from the target BS, a handover message including radio resource configuration information of a cell associated with the target BS. The transmitting unit may be configured to transmit, to the UE, a higher layer message included in the handover message.

In accordance with another aspect of the present disclosure, there is provided a UE for performing handover when the UE has dual connectivity with a first BS and a second BS. The UE may include a receiving unit, a controller, and a transmitting unit. The receiving unit may be configured to receive a higher layer message from the first BS. The controller may be configured to configure a radio bearer of a cell associated with a target BS, based on the higher layer message. The transmitting unit may be configured to access the target BS through random access and to transmit a higher layer signaling including handover complete information to the target BS.

Advantageous Effects

According to embodiments of the present disclosure, there are provided a method and an apparatus for a User Equipment (UE) configuring dual connectivity with a plurality of Base Stations (BSs) to process a radio bearer configured in a small cell upon the execution of handover.

Also, the present disclosure provides a method and apparatus for the UE to reconfigure, through a target BS, a radio bearer that was configured through dual connectivity with a small cell, so as to use the reconfigured radio bearer, even after executing handover.

BRIEF DESCRIPTION OF THE DRAWINGS

FIG. 6 is a diagram illustrating an information element of a handover preparation information message to which embodiments of the present disclosure are applied;

FIG. 7 is a diagram illustrating information associated with an AS-Config field of a handover preparation information message to which embodiments of the present disclosure are applied;

FIG. 8 is a diagram illustrating configuration information of an AS-Config field according to an embodiment of the present disclosure;

FIG. 9 is a diagram illustrating configuration information of an AS-Config field according to another embodiment of the present disclosure;

FIG. 10 is a diagram illustrating configuration information of an AS-Config field according to another embodiment of the present disclosure;

FIG. 11 is a diagram illustrating configuration information of an AS-Config field according to another embodiment of the present disclosure;

FIG. 12 is a diagram illustrating configuration information of an RRM-Config field according to another embodiment of the present disclosure;

MODE FOR CARRYING OUT THE INVENTION

Figure 1:
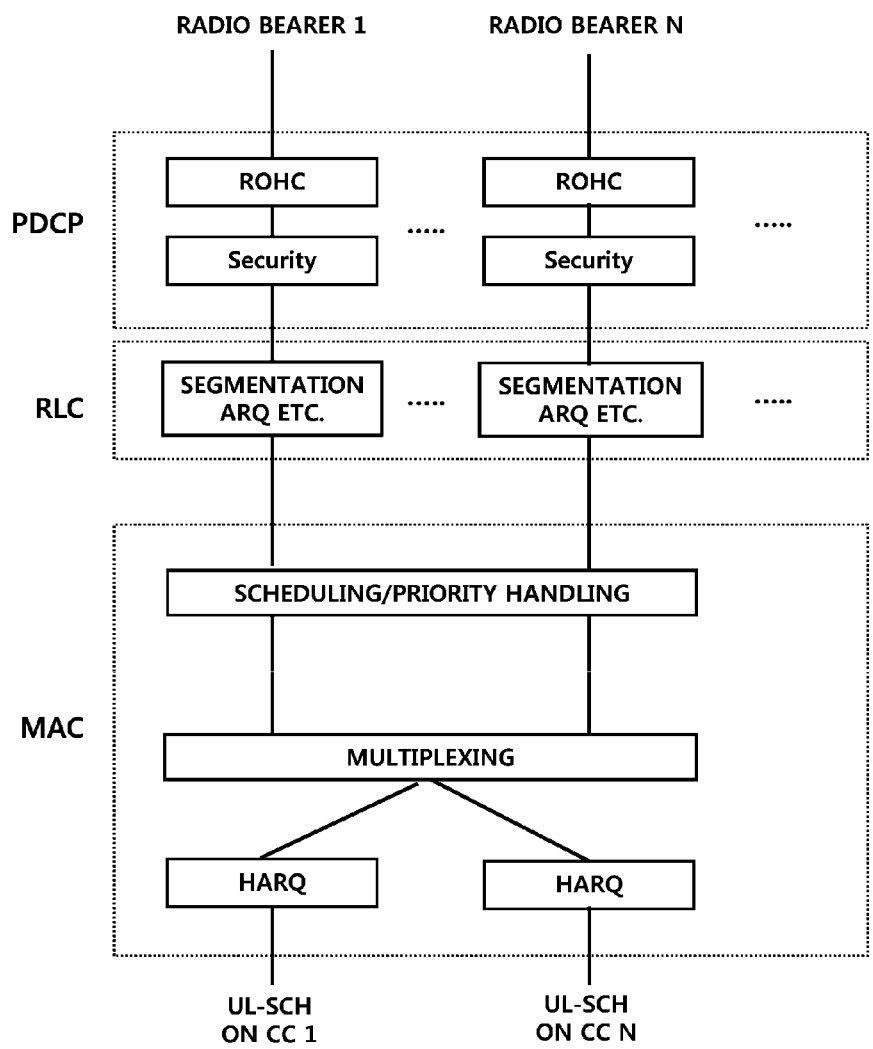
FIG. 1 is a diagram illustrating a structure of uplink layer 2 when a single Base Station (BS)-based carrier aggregation is configured.

Hereinafter, embodiments of the present disclosure will be described with reference to the exemplary drawings. In the following description, the same elements will be designated by the same reference numerals although they are shown in different drawings. Further, in the following description of the present disclosure, a detailed description of known functions and configurations incorporated herein will be omitted when it may make the subject matter of the present disclosure rather unclear.

The wireless communication system may be widely installed so as to provide various communication services, such as a voice service, packet data, and the like. The wireless communication system may include a User Equipment (UE) and a Base Station (BS or an eNB). Throughout the specifications, the user equipment may be an inclusive concept indicating a terminal utilized in wireless communication, including a UE (User Equipment) in wideband code division multiple access (WCDMA), long term evolution (LTE), high speed packet access (HSPA), and the like, and an MS (Mobile station), a UT (User Terminal), an SS (Subscriber Station), a wireless device, and the like in global systems for mobile communication (GSM).

A base station or a cell may generally refer to a station where communication with a User Equipment (UE) is performed, and may also be referred to as a Node-B, an evolved Node-B (eNB), a Sector, a Site, a Base Transceiver System (BTS), an Access Point, a Relay Node, a Remote Radio Head (RRH), a Radio Unit (RU), and the like.

That is, in the specification, the base station or the cell may be construed to be an inclusive concept indicating a portion of an area or function covered by a BSC (Base Station Controller) in CDMA, a NodeB in WCDMA, an eNB or a sector (site) in LTE, and the like, and this concept may include various coverage areas, such as a megacell, a macrocell, a microcell, a picocell, a femtocell, a communication range of a relay node, an RRU, and an RU, and the like.

In the specifications, the user equipment and the base station are used as two inclusive transceiving subjects to embody the technology and technical concepts described in the specifications, and may not be limited to a predetermined term or word. The user equipment and the base station are used as two inclusive transceiving subjects (Uplink and Downlink) to embody the technology and technical concepts described in the specifications, and may not be limited to a predetermined term or word. Here, Uplink (UL) refers to a scheme for a UE to transmit and receive data to/from a base station, and Downlink (DL) refers to a scheme for a base station to transmit and receive data to/from a UE.

Multiple access schemes may be unrestrictedly applied to the wireless communication system. The wireless communication system may utilize varied multiple access schemes, such as CDMA (Code Division Multiple Access), TDMA (Time Division Multiple Access), FDMA (Frequency Division Multiple Access), OFDMA (Orthogonal Frequency Division Multiple Access), OFDM-FDMA, OFDM-TDMA, OFDM-CDMA, and the like. An embodiment of the present disclosure may be applicable to resource allocation in an asynchronous wireless communication scheme that is advanced through GSM, WCDMA, and HSPA, to be LTE and LTE-advanced, and may be applicable to resource allocation in a synchronous wireless communication scheme that is advanced through CDMA and CDMA-2000, to be UMB. The present disclosure may not be limited to a specific wireless communication field, and may include all technical fields to which the technical idea of the present disclosure is applicable.

Uplink transmission and downlink transmission may be performed based on a TDD (Time Division Duplex) scheme that performs transmission based on different times, or based on an FDD (Frequency Division Duplex) scheme that performs transmission based on different frequencies.

Further, in a system such as LTE and LTE-A, a standard may be developed by configuring an uplink and a downlink based on a single carrier or a pair of carriers. The uplink and the downlink may transmit control information through a control channel, such as a PDCCH (Physical Downlink Control CHannel), PCFICH (Physical Control Format Indicator CHannel), PHICH (Physical Hybrid ARQ Indicator CHannel), PUCCH (Physical Uplink Control CHannel), and the like, and may be configured as a data channel, such as PDSCH (Physical Downlink Shared CHannel), PUSCH (Physical Uplink Shared CHannel), and the like, so as to transmit data.

In the present specification, a cell may refer to the coverage of a signal transmitted from a transmission/reception point, a component carrier having the coverage of the signal transmitted from the transmission/reception point (transmission point or transmission/reception point), or the transmission/reception point itself.

A wireless communication system according to embodiments refers to a Coordinated Multi-point transmission/reception (CoMP) system where two or more transmission/reception points cooperatively transmit a signal, a coordinated multi-antenna transmission system, or a coordinated multi-cell communication system. A CoMP system may include at least two multi-transmission/reception points and UEs.

A multiple transmission/reception points (or a transmission/reception communication system) may be a base station or a macro cell (hereinafter, referred to as an 'eNB') and at least one RRH that is connected to an eNB through an optical cable or an optical fiber and is wiredly controlled, and has a high transmission power or a low transmission power within a macrocell.

Hereinafter, a downlink refers to communication or a communication path from a multiple transmission/reception points to a UE, and an uplink refers to communication or a communication path from a UE to multiple transmission/reception points. In a downlink, a transmitter may be a part of multiple transmission/reception points and a receiver may be a part of a UE. In an uplink, a transmitter may be a part of a UE and a receiver may be a part of multiple transmission/reception points.

Hereinafter, the situation in which a signal is transmitted and received through a PUCCH, a PUSCH, a PDCCH, a PDSCH, or the like may be described through the expression, "a PUCCH, a PUSCH, a PDCCH, or a PDSCH is transmitted or received".

An eNB executes downlink transmission to UEs. The eNB 110 may transmit a Physical Downlink Shared Channel (PDSCH) which is a primary physical channel for unicast transmission, and may transmit a Physical Downlink Control Channel (PDCCH) for transmitting downlink control information, such as scheduling required for reception of a PDSCH, and scheduling grant information for transmission of an uplink data channel (for example, a Physical Uplink Shared Channel (PUSCH)). Hereinafter, transmission and reception of a signal through each channel will be described as transmission and reception of a corresponding channel.

A small cell uses a low-power node. Such a small cell is considered as a means to cope with an explosive increase of mobile traffic. The low power node indicates a node that uses a lower transmission power (Tx) than a general macro node.

The Carrier Aggregation (CA) technology before 3GPP Release 11 configures a small cell using a low power Remote Radio Head (RRH), which corresponds to antennas geographically distributed within a macro cell coverage.

However, to apply the CA technology, a macro cell and an RRH cell are configured to be scheduled under a control of a single BS. To this end, an ideal backhaul needs to be established between a macro cell BS and an RRH node.

The ideal backhaul indicates a backhaul that shows a significantly high throughput and a significantly low delay, like a dedicated point-to-point connection that uses an optical fiber and Line Of Sight (LOS) microwave. Unlike the above, a backhaul that shows a relatively low throughput and a relatively high delay, such as a Digital Subscriber Line (xDSL) and Non-LOS microwave, is referred to as a non-ideal backhaul.

Through the single BS-based Carrier Aggregation (CA), a plurality of serving cells may be aggregated to provide services to a User Equipment (UE). That is, a plurality of serving cells may be configured with respect to a UE in a Radio Resource Control (RRC) connected-state, and when an ideal backhaul is established between the macro cell nod and the RRH, the macro cell and the RRH cell are configured as serving cells and provide services to the UE.

When the above described single BS-based CA is configured, the UE may have only a single RRC connection with a network.

In RRC connection establishment/re-establishment/handover, a single serving cell may provide Non-Access Stratum (NAS) mobility information (for example, Tracking Area Identity (TAI)). I In the RRC connection re-establishment/handover, a single serving cell may provide a security input. The cell is referred to as a primary cell (PCell).

The PCell may be changed through only a handover procedure. Depending on capabilities of UEs, secondary cells (SCells) may be configured as serving cells together with the PCell.

A multi-carrier property of a physical layer according to the single BS-based CA may affect only a Medium Access Control (MAC) layer for a single Hybrid Automatic Retransmit reQuest (HARQ) entity required for each serving cell. Each HARQ entity may process a data stream of a Component Carrier (CC).

FIG. 1 is a diagram illustrating a structure of uplink layer 2 when a single Base Station (BS)-based carrier aggregation is configured.

Referring to FIG. 1, a Packet Data Convergence Protocol (PDCP) layer operates on a Radio Link Control (RLC) layer. Each radio bearer (RB, for example, DRB and SRB) may be linked with a single PDCP entity. Each PDCP entity may be linked with one or two RLC entities based on an RB characteristic (that is, uni-direction or bi-direction) and an RLC mode. A single PDCP entity may be linked with a control plane or a user plane, based on an entity that it delivers.

Particularly, the structure of layer 2 will be described from the perspective of functions. A PDCP layer of a BS receives a PDCP Service Data Unit (SDU) from a higher layer and executes sequence numbering and header compression. In this instance, the header compression may be executed in the case of user plane data.

Subsequently, the PDCP layer of the BS may execute integrity protection and encryption of a packet associated with the PDCP SDU and adds a PDCP header and transfers the same to a lower layer.

In the case of a packet not associated with the PDCP SDU, the PDCP layer of the BS does not execute the integrity protection and encryption and adds a PDCP header and transfers the same to the lower layer.

A PDCP Protocol Data Unit (PDU) generated as described above may be transferred to a PDCP layer of the UE through an air interface.

According to the operations of the PDCP layer of the UE, the PDCP header is removed from the received PDCP PDU and integrity protection and encryption of the packet associated with the PDCP SDU is executed. In the case of the packet not associated with the PDCP SDU, the integrity protection and encryption may not be executed.

Subsequently, the PDCP SDU may be transferred to a higher layer after decompressing the header compression and detecting redundancy.

As described above, to utilize a small cell that uses the CA in the typical mobile communication network, a macro cell and a small cell need to be scheduled under a single BS. To this end, there is a drawback in that an ideal backhaul needs to be established between a macro cell node and a small cell node.

Therefore, the CA may not be utilized when the macro cell and the small cell are established by individual BSs through a non-ideal backhaul. Accordingly, there is a drawback in that the mobility of a UE is not supported when the UE simultaneously has connections with the macro cell and the small cell provided by individual BSs.

To overcome the above described drawbacks, the present disclosure provides a method and apparatus to enable a UE that has dual connectivity with a macro cell and a small cell to process a radio bearer configured in a small cell when handover is executed, through the small cell under a control of the macro cell or cooperation between the macro cell and the small cell, in an environment where the macro cell and the small cells are configured by individual BSs in a mobile communication network.

Hereinafter, a small cell deployment scenario in which a BS providing a macro cell is different from a BS providing a small cell according to at least one embodiment of the present disclosure will be briefly described.

In the present specifications, when a UE configures dual connectivity, a master BS is located at an ending point of Si-MME and configures RRC connection with the UE. Such a master BS will be described as a first BS.

The master BS may be a BS that provides a macro cell. The master BS may be a BS that provides any one of the small cells of dual connectivity. Also, as described above, the master BS may be a BS that provides a PCell that is associated with handover.

Also, a secondary BS provides an additional radio resource to a UE. Such a secondary BS is distinguished from a master BS in a dual connectivity environment. The secondary BS will be described as a second BS.

The first BS and the second BS may provide at least one cell to each UE, and the first BS and the second BS may be connected through an interface (for example, X2 interface) between dual connectivity BSs. For ease of description, a cell associated with the first BS may be described as a macro cell, and a cell associated with the second BS may be described as a small cell. However, in the small cell cluster scenario provided below, a cell associated with the first BS may also be described as a small cell.

In the present disclosure, a macro cell may denote each of cells, or may denote all of cells associated with the first BS. Also, a small cell may also denote each of cells and may indicate all of cells associated with the second BS. However, as described above, in a predetermined scenario such as the small cell cluster, this may be a cell associated with the first cell. In this instance, a cell of the second BS may be described as another small cell or still another small cell.

A BS communicating with a UE and determining handover in a handover procedure is referred to as a source BS. A BS that a UE desires to access through the handover procedure is referred to as a target BS. In the present specification, the first BS determines handover when the first BS and the second BS are dually connected to the UE. Thus, the source BS determining handover in the dual connectivity state is described as the first BS or a BS.

Figure 2:
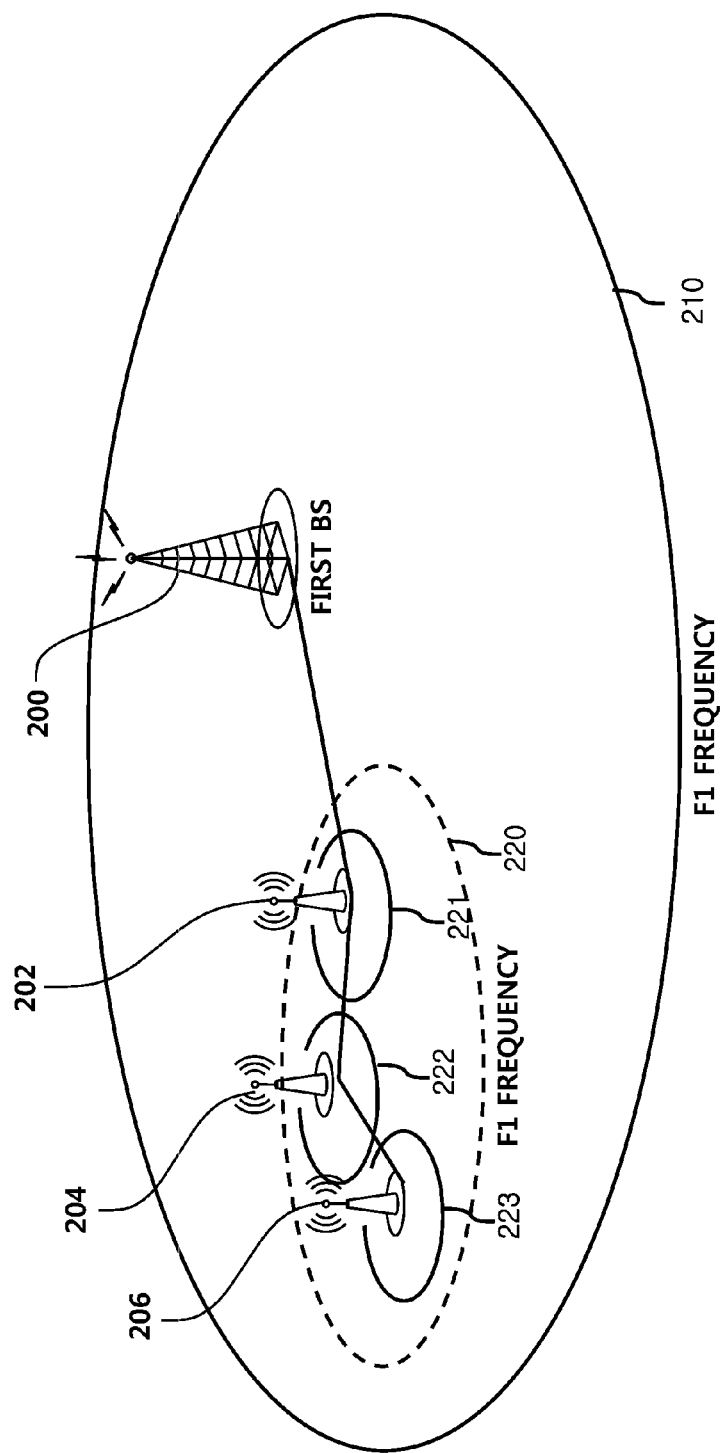
FIG. 2 is a diagram illustrating an example of a small cell network to which embodiments of the present disclosure are applied.
Figure 3:
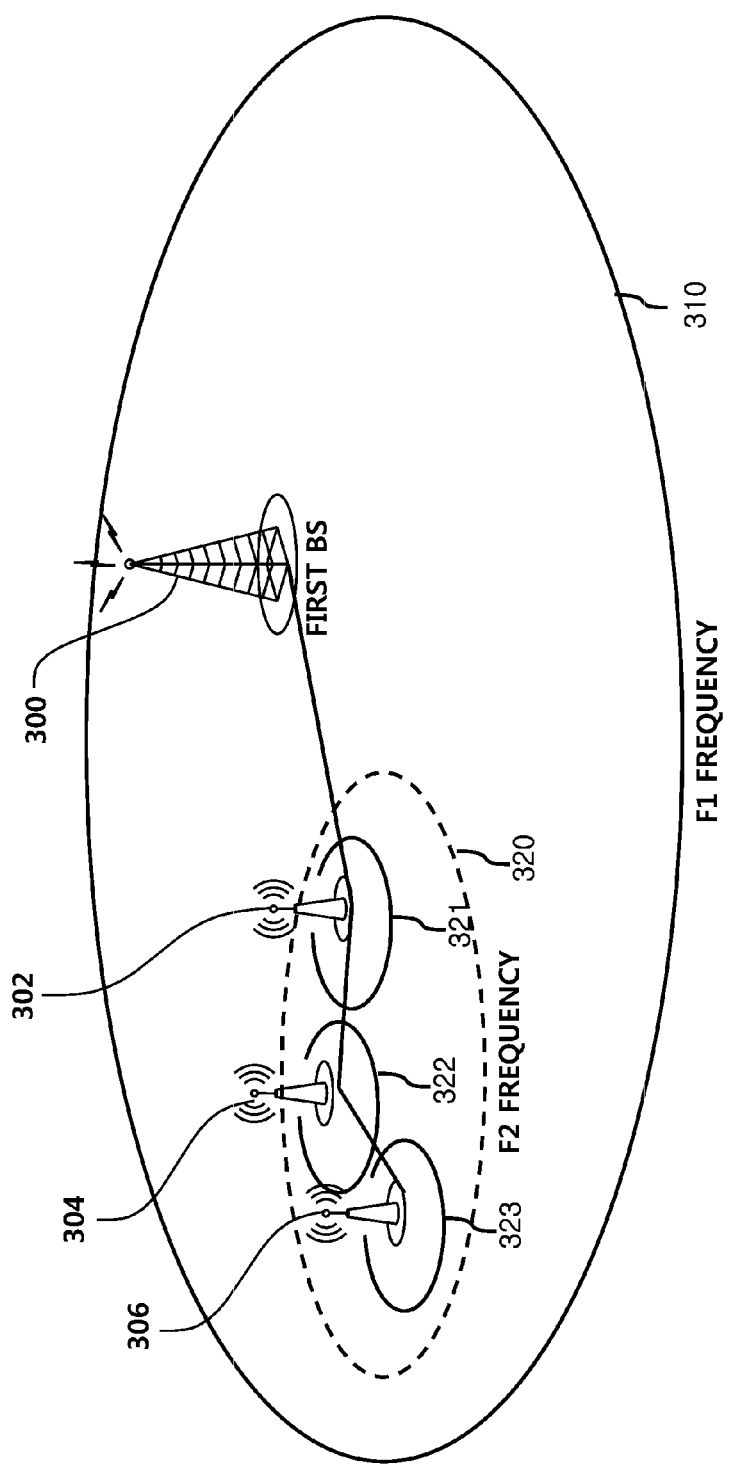
FIG. 3 is a diagram illustrating another example of a small cell network to which embodiments of the present disclosure are applied.

FIG. 2 and FIG. 3 are network configuration scenarios according to embodiments of the present disclosure.

FIG. 2 is a diagram illustrating an example of a small cell network to which embodiments of the present disclosure are applied.

Referring to FIG. 2, a macro cell 210 and small cells 221, 222, and 223 have an identical carrier frequency (F1). A first BS 200 and second BSs 202, 204, and 206 are connected through a non-ideal backhaul. The small cells 221, 222, and 223 are established in an overlaid macro cell 210. An outdoor small cell environment and a small cell cluster 220 are considered.

FIG. 3 is a diagram illustrating another example of a small cell network to which embodiments of the present disclosure are applied.

Referring to FIG. 3, a macro cell 310 and small cells 321, 322, and 323 have different carrier frequencies (F1 and F2), and a first BS 300 and second BSs 302, 304, and 306 are connected through a non-ideal backhaul. The small cells 321, 322, and 323 are established in an overlaid macro cell 310. An outdoor small cell environment or an indoor small cell environment, and a small cell cluster 320 are considered.

In scenarios of FIG. 2 and FIG. 3, a second BS may operate as a stand-alone BS. That is, a UE may establish a single RRC connection with a small cell BS and may configure one or more Signaling Radio Bearers (SRBs), for transmission of control plane data. For transmission of user plane data, the UE may have one or more Data Radio Bearers (DRBs), with a second BS.

In the scenarios of FIG. 2 and FIG. 3, the UE may transmit user plane data through one or more second BSs under a control of the first BS or through the cooperation between the first BS and one or more second BSs. That is, the UE may establish a single RRC connection with the first BS and may configure one or more Signaling Radio Bearers (SRBs) for transmission of control plane data. Also, for user plane data transmission, the UE may configure Data Radio Bearers (DRBs), with respect to the first BS and/or the second BS. For example, one or more DRBs may be configured that simultaneously use radio resources of the first BS and the second BS. As another example, one or more DRBs may be configured that uses only a radio resource of the first BS. As another example, one or more DRBs may be configured that uses only a radio resource of the second BS.

Figure 4:
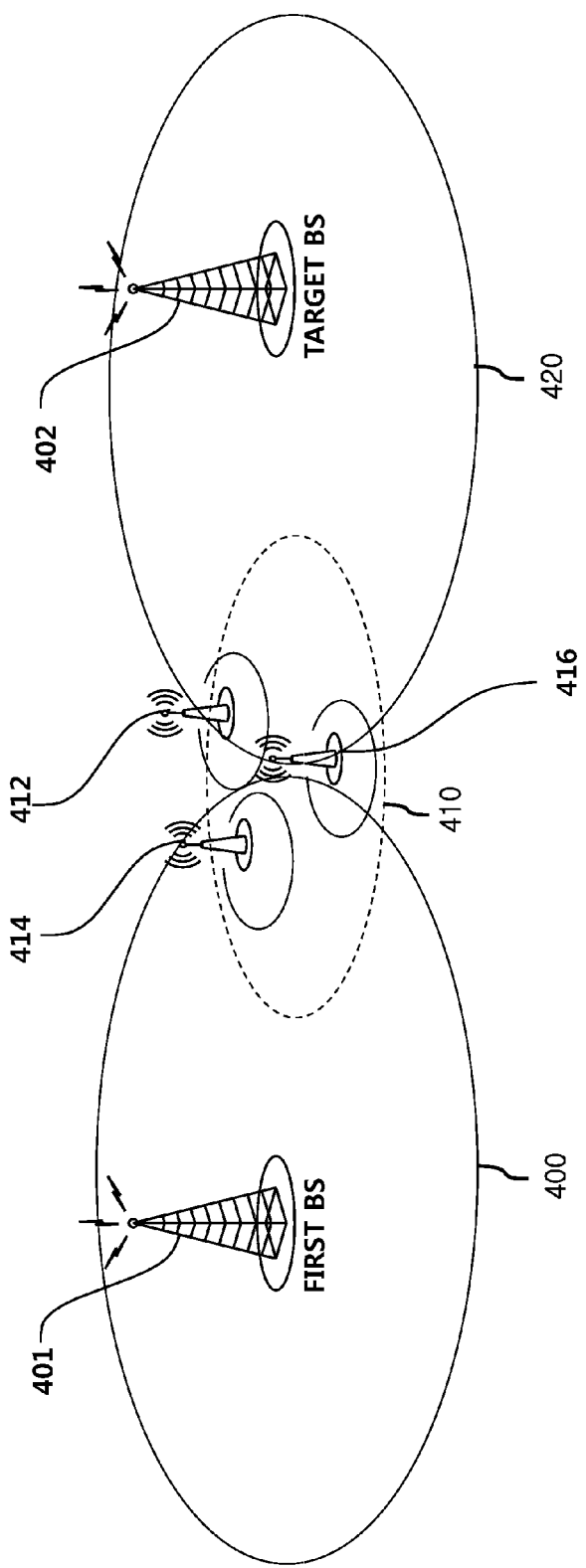
FIG. 4 is a diagram illustrating another example of a small cell network to which embodiments of the present disclosure are applied.

FIG. 4 is a diagram illustrating another example of a small cell network to which embodiments of the present disclosure are applied.

As illustrated in FIG. 4, the second BSs 410, 412, and 414 may be configured in an edge of the macro cell 400 and 420.

When a UE is located in an overlapping region of a first BS coverage 400 of FIG. 4 and a small cluster coverage 410, the UE may establish an RRC connection with the first BS 410 and may configure one or more Signaling Radio Bearers (SRBs), for transmission of control plane data.

Also, for the user plane data transmission, the UE may configure Data Radio Bearers (DRBs), with respect to the first BS 401 and/or the small cell BSs 410, 412, and 414. To this end, the first BS 401 may configure radio resources with respect to the first BS 401 and/or second BSs 410, 412, and 414, through an RRC connection reconfiguration procedure.

The radio bearer information may indicate radio bearer configuration information.

As an example of configuring a radio resource with respect to the second BS 410, 412, and 414 or a cell associated with the second BS, a second BS cell identifier (for example, a PCI), a secondary cell index associated with the second BS (for example, a second BS SCell index), or information for a UE to identify a second BS cell (or second BS) radio bearer may be included, in radio bearer information (drb-ToAddMod) of the radio resource configuration (radioResourceConfigDedicated) information.

The information used for the UE to identify the second BS cell (or second BS) radio bearer may include at least one piece of information from among an index, an identifier, and indication information, used for the UE to identify the second BS cell (or second BS) radio bearer.

Hereinafter, for ease of description, the information used for the UE to identify the second BS cell (or second BS) radio bearer is described as index/identifier/indication information used for the UE to identify the second BS cell (or second BS) radio bearer.

Also, detailed configuration information (for example, eps-BearerIdentity, drb-Identity, second BS pdcp-Config, second BS rlc-Config, logicalChannelIdentity, and logicalChannelConfig) for configuration of the second BS cell (or second BS) radio bearer may be included.

Hereinafter, for ease of description, a cell provided by the second BS is described as a cell associated with a second BS SCell, an SCell, the second BS, or a second BS cell group. As described above, in the typical LTE CA before the 3GPP rel-11, an SCell refers to a first BS secondary cell that is used as a serving cell in addition to a first BS PCell. Hereinafter, however, a cell provided through the second BS is used as a serving cell in addition to the first BS cell. Thus, a cell that the second BS provides is referred to as an SCell. When it needs to distinguish the first BS secondary cell from the cell that the second BS provides, they are described to be distinguished. As another example of the method of configuring a radio resource with respect to the second BS or a cell associated with the second BS, the method may add second BS radio bearer information (for example, drb-ToAddMod) or detailed configuration information for configuration of a second BS radio bearer (for example, eps-BearerIdentity, drb-Identity, second BS pdcp-Config, second BS rlc-Config, logicalChannelIdentity, and logicalChannelConfig) in second BS SCell radio resource configuration (radioResourceConfigDedicatedSCell) information (or expressed as second BS cell radio resource configuration (radioResourceConfigSeNBCell or radioResourceConfigSecondaryCellGroup) information or second BS radio resource configuration information (radioResourceConfigDedicatedSeNB), hereinafter referred to as second BS SCell radio resource configuration (radioResourceConfigDedicatedSCell)information). Also, the method includes a second BS cell identifier (for example, a PCI), a second BS SCell index, or index/identifier/indication information used for a UE to identify a second BS cell (or second BS) radio bearer, in the second BS radio bearer information or the detailed configuration information for the second BS radio bearer configuration. Through the process, the UE may configure a radio bearer that uses only the second BS cell (or second BS) radio resource.

As another example of the method of configuring a radio resource with respect to the second BS, the method may include second BS cell index/identifier/indication information used for identifying a second BS cell, in a second BS cell addition/modification information (SCellToAddMod or SeNBCellToAddMod or SeNBSCelltoAddMod). As described above, the radio resource configuration information of the second BS or the cell associated with the second BS may include radio bearer configuration information of a radio bearer that uses only the radio resource of the second BS or the second BS cell. Alternatively, the radio resource configuration information of the second BS or the cell associated with the second BS may indicate radio bearer configuration information of a radio bearer that uses only the radio resource of the second BS or the second BS cell. Alternatively, the radio resource configuration information associated with the second BS or the cell associated with the second BS may indicate information used for configuring a radio bearer that uses only the second BS or the cell associated with the second BS through a target BS or a cell associated with the target BS.

This is merely an example of the method of configuring a radio resource with respect to the second BS and the present disclosure may not be limited thereto.

Referring to FIG. 4, when the UE configures dual connectivity with the first BS 401 and the second BS (one of the second BSs 410, 412, and 414) and when the UE moves to a coverage of the cell 420 provided by the target BS 402, the UE may execute handover from the first BS 401 to the target BS 402.

Hereinafter, a handover operation when a UE moves from an overlapping region of a coverage of a cell associated with a first BS and a coverage of a cell associated with a second BS to a cell associated with a target BS or a region where a coverage of the cell associated with the target BS and a coverage of the cell associated with the second BS, will be described in detail.

Figure 5:
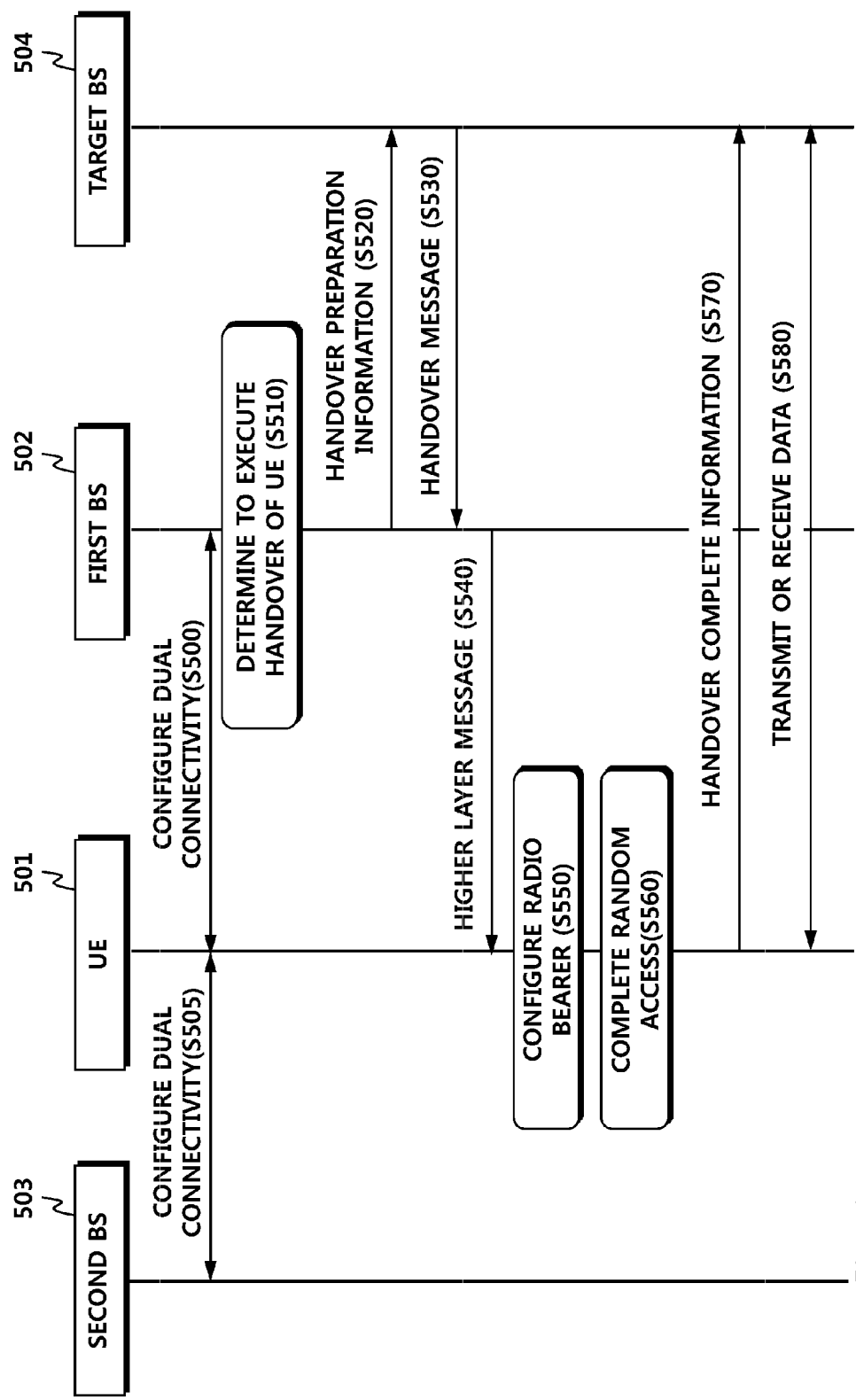
FIG. 5 is a diagram illustrating a handover procedure according to an embodiment of the present disclosure.

FIG. 5 is a diagram illustrating a handover procedure according to an embodiment of the present disclosure.

According to an embodiment of the present disclosure, when a first BS configures dual connectivity with a UE, a method of controlling handover of the UE may include determining handover of the UE, transmitting, to a target BS, handover preparation information including radio resource configuration information of a cell associated with a second BS, receiving, from the target BS, a handover message including radio resource configuration information of a cell associated with the target BS, and transmitting the handover message to the UE.

Referring to FIG. 5, a UE 501 configures dual connectivity with a first BS (or BS) 502 and a second BS 503 in operations S500 and S505.

When the UE 501 moves to the target BS 504 or to a coverage of a cell associated with the target BS 504 and the second BS, as described above, the first BS 502 receives a measurement report from the UE 501 and determines handover of the UE in operation S510.

The first BS 502 (for example, a macro cell BS 502) may prepare one or more target cells, before the first BS 502 transmits a handover message to the UE 501. The first BS 502 may select a target cell (for example, target BS 504).

The first BS 502 transmits, to the target BS 504, an information message required for preparing handover in operation S520.

The target BS 504 receives, from the first BS 502, handover preparation information message and transmits a handover message including information that is needed when the UE 501 executes handover, radio bearer configuration information of the UE, and the like, to the UE through the first BS, in operation S530 and S540.

The first BS 502 receives the handover message of the target BS 504 and transparently transfers the same to the UE. That is, the first BS 502 merely transfers the handover message received from the target BS 504, to the UE 501.

For example, the above described handover preparation information message and the handover message may be transmitted or received through an X2 interface, which may be connected between the first BS and the target BS.

The UE 501 receives the handover message and configures a radio bearer based on the same in operation S550 and completes a random access procedure with respect to the target BS 504 in operation S560.

The UE 501 transmits handover complete information indicating that handover to the target BS 504 is completed and the UE 501 normally accesses the target BS 504 in operation S570.

The handover complete information may be transmitted through a higher layer signaling, and for example, an RRC Connection Reconfiguration Complete message may be transmitted.

Subsequently, the UE 501 transmits or receives data through the target BS, the cell associated with the target BS, or a target BS PCell, in operation S580.

FIG. 6 is a diagram illustrating an information element of a handover preparation information message to which embodiments of the present disclosure are applied.

The handover preparation information message transmitted by the first BS to the target BS, as described with reference to FIG. 5, may include information required for the UE to execute handover from the first BS to the target BS.

Referring to FIG. 6, information associated with a radio access capability of a UE (ue-RadioAccessCapabilityInfo), AS configuration (AS-Config) information, rrm-Config information, AS-Context information, and the like may be included. Alternatively, one or more pieces of the information may be included.

Handover preparation information, according to an embodiment of the present disclosure, may include UE capability information associated with a capability of the UE to use radio resources of the first BS and the second BS through dual connectivity. For example, single Tx/Rx or multi-Tx/Rx capability information may be included.

The handover preparation information according to an embodiment of the present disclosure may include radio resource configuration information of the cell associated with the second BS with which the UE configures dual connectivity.

The target BS may generate an effective handover message by obtaining information associated with a radio bearer of the cell associated with the second BS of the UE, based on the radio resource configuration information of the cell associated with the second BS. In the related art, the target BS only obtains information associated with a radio bearer of the first BS, the cell associated with the first BS, or a first BS PCell. Thus, after completion of handover, data transmission of the UE through a radio bearer of the second BS or a radio bearer of the cell associated with the second BS is disconnected disadvantageously.

The radio resource configuration information of the cell associated with the second BS, according to an embodiment of the present disclosure, may be transmitted by being included in an AS-Config information field or an RRM-Config information field of the handover preparation information message.

The radio resource configuration information of the cell associated with the second BS may be included in either an AS-Config information field or an RRM-Config information field, and hereinafter, each embodiment will be described in detail.

1. Method of Including Information in AS-Config Information Element

FIG. 7 is a diagram illustrating information associated with an AS-Config field of a handover preparation information message to which embodiments of the present disclosure are applied.

The AS-Config Information Element (IE) included in the handover preparation information message is associated with RRC configuration information transmitted by a first BS. The AS-Config IE may be used for determining a necessity of RRC configuration modification by a target BS during a handover preparation operation. The radio resource configuration information of a cell associated with a second BS may be included in the AS-Config information element according to at least one embodiment of the present disclosure. The information may be used after successful completion of handover or during an RRC connection re-establishment.

A handover preparation information message, according to an embodiment of the present disclosure, may include radio resource configuration information of the cell associated with the second BS, and the radio resource configuration information of the cell associated with the second BS may include radio bearer configuration information of a radio bearer in the cell associated with the second BS or detailed configuration information of a radio bearer associated with the second BS.

Also, according to another embodiment of the present disclosure, the radio resource configuration information of the cell associated with the second BS of the handover preparation information message may include at least one piece of information from among second BS cell index information, a second BS cell identifier, and index/identifier/indication information used for a UE to identify a second BS cell (or second BS) radio bearer.

Also, according to another embodiment of the present disclosure, the radio bearer configuration information of the cell associated with the second BS or the detailed configuration information of a radio bearer associated with the second BS, which is included in the radio resource configuration information of the cell associated with the second BS of the handover preparation information message, may be used for configuring the radio bearer of the cell associated with the second BS to be a radio bearer through a cell associated with a target BS.

Particularly, in association with the case in which the radio resource configuration information of the cell associated with the second BS is included in the AS-Config information element, each embodiment will be described with reference to drawings.

First Embodiment

This is a method of transmitting radio resource configuration information of a cell associated with a second BS by adding a second BS cell radio resource configuration information element.

FIG. 8 is a diagram illustrating configuration information of an AS-Config field according to an embodiment of the present disclosure.

Referring to FIG. 8, sourceSCellConfigList information 810 included in an AS-Config Information Element (IE) indicates radio resource configuration information (common and dedicated) of first BS secondary cells, in the same manner as a single BS-based 3GPP rel-10. As another example, the sourceSCellConfigList information 810 indicates radio resource configuration information (common and dedicated) of cells (SCells) associated with a second BS. The sourceSCellConfigList information 810 may include second BS cell index/identifier/indication information for identifying the second BS cell, in second BS cell addition and modification information (SCellToAddMod-r12). A sourceSCellConfigList information element may have a format identical to that of single BS-based rel-10 secondary cell addition information (SCellToAddModList-r10), or may have a new format. For example, sourceSCellConfig-List may be defined as a new information element (sourceSCellConfigList-r12, (SCellToAddModList-r12)) including additional information for dual connectivity, in addition to rel-10 secondary cell addition information.

The sourcePCellRadioResourceConfig information 801 may indicate radio resource configuration information associated with all radio bearers existing in a cell associated with a first BS (for example, PCell).

sourceSCellRadioResourceConfig(or expressed as sourceSecondaryCellGroupRadioResourceConfig or sourceSeNBRadioResourceConfig or SecondaryCellGroupRadioResourceConfig or SecondaryCellRadioResource, and hereinafter referred to as sourceSCellRadioResourceConfig) information 805 may indicate radio resource configuration information associated with all radio bearers existing in a cell associated with the second BS (for example, an SCell) or existing (configured) in the second BS.

The radio bearer information (for example, srb-ToAddModList, drb-ToAddModList) or detailed configuration information of a radio bearer, which is included in the sourcePCellRadioResourceConfig information 801 and/or sourceSCellRadioResourceConfig information 805, may include information indicating that a predetermined radio bearer is configured through a cell associated with a predetermined second BS (or a predetermined second BS). For example, a second BS associated cell index (for example, an SCell index), a second BS cell identifier (for example, a PCI), or index/identifier/indication information used for a UE to identify a radio bearer associated with the second BS (or the second BS cell), may be included.

A target BS receives, from the first BS, a handover preparation information message configured as described in FIG. 8 and receives radio resource configuration information of the cell associated with the second BS (or the second BS) and radio bearer configuration information or detailed configuration information of a radio bearer.

Second Embodiment

This is a method of transmitting radio resource configuration information of a cell associated with a second BS by adding a second BS cell configuration (sourceSCellConfig) information element.

FIG. 9 is a diagram illustrating configuration information of an AS-Config field according to another embodiment of the present disclosure.

Referring to FIG. 9, sourceSCellConfigList information included in an AS-Config IE (Information Element) indicates radio resource configuration information (common and dedicated) of first BS secondary cells, in the same manner as a single BS-based rel-10. As another example, sourceSCellConfigList information indicates radio resource configuration information (common and dedicated) of cells associated with a second BS.

The sourceSCellConfigList information may include second BS cell index/identifier/indication information for distinguishing the first BS secondary cell and the second BS cell, in second BS cell addition and modification information (SCellToAddMod-r12).

A sourceSCellConfigList information element may have a format identical to that of single BS-based rel-10 secondary cell addition information (SCellToAddModList-r10), or may have a new format. For example, sourceSCellConfigList may be defined as a new information element (sourceSCellConfigList-r12, (SCellToAddModList-r12)) including additional information for dual connectivity, in addition to rel-10 secondary cell addition information (SCellToAddModList-r10).

The sourceRadioResourceConfig information may indicate radio resource configuration information associated with all radio bearers existing in a cell associated with a first BS.

sourceSCellConfig information 900 may include radio resource configuration information associated with all radio bearers existing in cells associated with the second BS.

The radio bearer configuration information (for example, srb-ToAddModList, drb-ToAddModList) or detailed configuration information of a radio bearer, which is included in the sourceRadioResourceConfig information and/or sourceSCellConfig information 900, may include information indicating that a predetermined radio bearer is configured through a cell associated with a predetermined second BS (or a predetermined second BS). For example, a second BS associated cell index (for example, an SCell index), a second BS cell identifier (for example, a PCI), or index/identifier/indication information used for a UE to identify a radio bearer associated with the second BS (or a second BS cell) may be included.

As another example, sourceSCellConfigList information indicates radio resource configuration information (common and dedicated) of the first BS secondary cells and/or cells associated with the second BS.

The sourceSCellConfigList information may include second BS cell index/identifier/indication information for identifying the second BS cell, in second BS cell addition and modification information (SCellToAddMod-r12). A sourceSCellConfigList information element may have a format identical to that of single BS-based rel-10 secondary cell addition information (SCellToAddModList-r10), or may have a new format. For example, sourceSCellConfigList may be defined as a new information element (sourceSCellConfigList-r12 (SCellToAddModList-r12)) including additional information for dual connectivity, in addition to rel-10 secondary cell addition information (SCellToAddModList-r10).

The sourceRadioResourceConfig information may indicate radio resource configuration information of all radio bearers existing in a cell associated with the first BS and the second BS (that is, irrespective of a PCell and an SCell, or the first BS or the second BS). For example, radio bearer information associated with all radio bearers included in all source serving cells may be included. That is, radio resource configuration information associated with all radio bearers provided through the second BS may be included in addition to radio resource configuration information associated with all radio bearers existing in a source PCell of the conventional single BS-based LTE.

In this instance, the sourceSCellConfig information 900 which is an information element for including the second BS radio bearer information may not be included in the AS-Config information element.

According to another method, the sourceSCellConfigList information may include radio resource configuration information (common and dedicated) of first BS secondary cells and/or the cell associated with the second BS, and radio resource configuration information of all radio bearers existing (or configured) in cells associated with the second BS.

The sourceRadioResourceConfig information may indicate radio resource configuration information associated with all radio bearers existing in the cell associated with the first BS (or PCell).

In the same manner, in this instance, the sourceSCellConfig information 900, which is an information element for including the second BS radio bearer information, may not be included in the AS-Config IE.

Third Embodiment

This is a method of transmitting radio resource configuration information of a cell associated with a second BS by adding a second BS cell radio resource configuration (sourceSCellRadioResourceConfig) information element.

FIG. 10 is a diagram illustrating configuration information of an AS-Config field according to another embodiment of the present disclosure.

sourceSCellConfigList information 1010 included in the AS-Config Information Element (IE) may indicate radio resource configuration information (common and dedicated) of first BS secondary cells, in the same manner as a single BS-based rel-10. As another example, the sourceSCellConfigList information 1010 may indicate radio resource configuration information (common and dedicated) of cells associated with a second BS.

The sourceSCellConfigList information may include second BS cell index/identifier/indication information for identifying the second BS cell, in second BS cell addition and modification information (SCellToAddMod-r12).

A sourceSCellConfigList information element may have a format identical to that of single BS-based rel-10 secondary cell addition information (SCellToAddModList-r10), or may have a new format. For example, sourceSCellConfigList may be defined as a new information element (sourceSCellConfigList-r12, (SCellToAddModList-r12)) including additional information for dual connectivity, in addition to rel-10 secondary cell addition information (SCellToAddModList-r10).

The sourcePCellRadioResourceConfig information 1001 may indicate radio resource configuration information associated with all radio bearers existing in a cell associated with a first BS (for example, a PCell).

sourceSCellRadioResourceConfig information 1005 may include radio resource configuration information associated with all radio bearers existing (configured) in a cell associated with the second BS or in the second BS.

The radio bearer information (for example, srb-ToAddModList, drb-ToAddModList) or detailed configuration information of a radio bearer, which is included in the sourcePCellRadioResourceConfig information 1001 and/or sourceSCellRadioResourceConfig information 1005, may include information indicating that a predetermined radio bearer is configured through the cell associated with the second BS (or the second BS). For example, a second BS associated cell index (for example, an SCell index), a second BS cell identifier (for example, a PCI), or index/identifier/indication information used for a UE to identify a radio bearer associated with the second BS (or the second BS cell) may be included.

Radio resource configuration information of radio bearers that simultaneously use radio resources of the first BS and the second BS may be included in the sourcePCellRadioResourceConfig information 1001. As another method, the radio resource configuration information of radio bearers that simultaneously use radio resources of the first BS and the second BS may be included in the sourcePCellRadioResourceConfig information 1005.

Fourth Embodiment

This is a method of transmitting radio resource configuration information of a cell associated with a second BS by modifying second BS cell configuration (sourceSCellConfig) information.

FIG. 11 is a diagram illustrating configuration information of an AS-Config field according to another embodiment of the present disclosure.

Referring to FIG. 11, sourceSCellConfigList information included in an AS-Config IE (Information Element) may indicate radio resource configuration information (common and dedicated) of first BS secondary cells, in the same manner as a single BS-based 3GPP rel-10. As another method, sourceSCellConfigList information may indicate radio resource configuration information (common and dedicated) of cells associated with a second BS.

The sourceSCellConfigList information may include second BS cell index/identifier/indication information for distinguishing the first BS secondary cell and the second BS cell, in second BS cell addition and modification information (SCellToAddMod-r12).

A sourceSCellConfigList information element may have a format identical to that of single BS-based rel-10 secondary cell addition information (SCellToAddModList-r10), or may have a new format. For example, sourceSCellConfigList may be defined as a new information element (sourceSCellConfigList-r12 (SCellToAddModList-r12)) including additional information for dual connectivity, in addition to rel-10 secondary cell addition information (SCellToAddModList-r10).

The sourceRadioResourceConfig information may indicate radio resource configuration information associated with all radio bearers existing in a cell associated with a first BS.

sourceSCellConfig information 1100 may include radio resource configuration information associated with all radio bearers existing in cells associated with the second BS.

The radio bearer information (for example, srb-ToAddModList, drb-ToAddModList) or detailed configuration information of a radio bearer, which is included in the sourceRadioResourceConfig information and/or sourceSCellConfig information 1100, may include information indicating that a predetermined radio bearer is configured through a cell associated with the second BS (or the second BS). For example, a second BS associated cell index (for example, an SCell index), a cell identifier (for example, a PCI), or index/identifier/indication information used for a UE to identify a radio bearer associated with the second BS (or the second BS cell) may be included.

Each embodiment has been described in association with the case where the radio resource configuration information of the cell associated with the second BS is included in the AS-Config field, with reference to drawings. In the above described embodiments, the radio resource configuration information of the cell associated with the second BS may include radio bearer configuration information or detailed configuration information of a radio bearer in the cell associated with the second BS. Also, the radio resource configuration information of cell associated with the second BS may include at least one piece of information from among second BS-associated cell information, a second BS cell identifier, a second BS secondary cell index, and index/identifier/indication information used for a UE to identify a second BS (or second BS cell) radio bearer.

Each embodiment is about which information element is used as the second BS cell radio resource configuration information element. Basically, the embodiments are identical in that they use an information element including second cell (or second BS) radio bearer information or detailed configuration information of a second BS cell (or second BS) radio bearer. As an example, as described in the first embodiment or the second embodiment, the second BS cell (or second BS) radio bearer configuration information may be included in radioResourceConfigDedicated information of an RRC reconfiguration message. As an example, as described in the third embodiment or the fourth embodiment, the second BS cell (or second BS) radio bearer configuration information may be included in second BS cell radio resource configuration information (radioResourceConfigDedicatedSCell or radioResourceConfigSeNBCell or radioResourceConfigSecondaryCellGroup) of an RRC reconfiguration message.

2. Method of Including Information in RRM-Config Information Element and Transmitting the Same FIG. 12 is a diagram illustrating configuration information of an RRM-Config field according to another embodiment of the present disclosure.

Referring to FIG. 12, an RRM-Config IE (Information Element) included in the above described handover preparation information message may be used by a target BS as UE-specific radio resource management information.

The RRM-Config IE may include information associated with a cell candidate (CandidateCellInfoList-r10) of a target cell, as illustrated in FIG. 12.

The information associated with the cell candidate of the target cell may include a Physical Cell ID, a carrier frequency, a Reference Signal Received Power (RSRP), and a Reference Signal Receive Quality (RSRQ).

As another example, the information associated with the cell candidate of the target cell may include a Physical Cell ID, a carrier frequency, a Reference Signal Received Power (RSRP), a Reference Signal Receive Quality (RSRQ), and radio bearer configuration indication information. The radio bearer configuration indication information may include second BS-associated cell information, a second BS cell identifier, a second BS secondary cell index, and information indicating that a radio bearer is configured in a second BS cell candidate.

The target BS (for example, a BS to which a UE desires to move) receives radio resource configuration information of cells associated with a second BS (or radio resource configuration information associated with the second BS). According to the method of the described each embodiment, such a target BS may determine whether to configure or release SCells using which second BS-associated cell after handover or during handover, or determine whether to maintain or release which second BS-associated cell during handover, or determine whether to configure a radio bearer of a cell associated with a second BS through a cell associated with a second BS (or a second BS) as described in the following first or second embodiment or to configure a radio bearer of a cell associated with a second BS through a cell associated with a target BS (or a target BS) as described in the following third embodiment.

The target BS may generate a message used for executing handover, that is, a higher layer message (an RRC reconfiguration message) including AS (Access Stratum)-Configuration to be used in the target cell.

A first BS forwards a handover message received from the target BS transparently (that is, without changing a value or contents) to a UE. That is, the first BS transmits, to the UE, the higher layer message included in the handover message.

The above described operations of the BS will be described again with reference to drawings. Here, the BS indicates the first BS.

Figure 13:
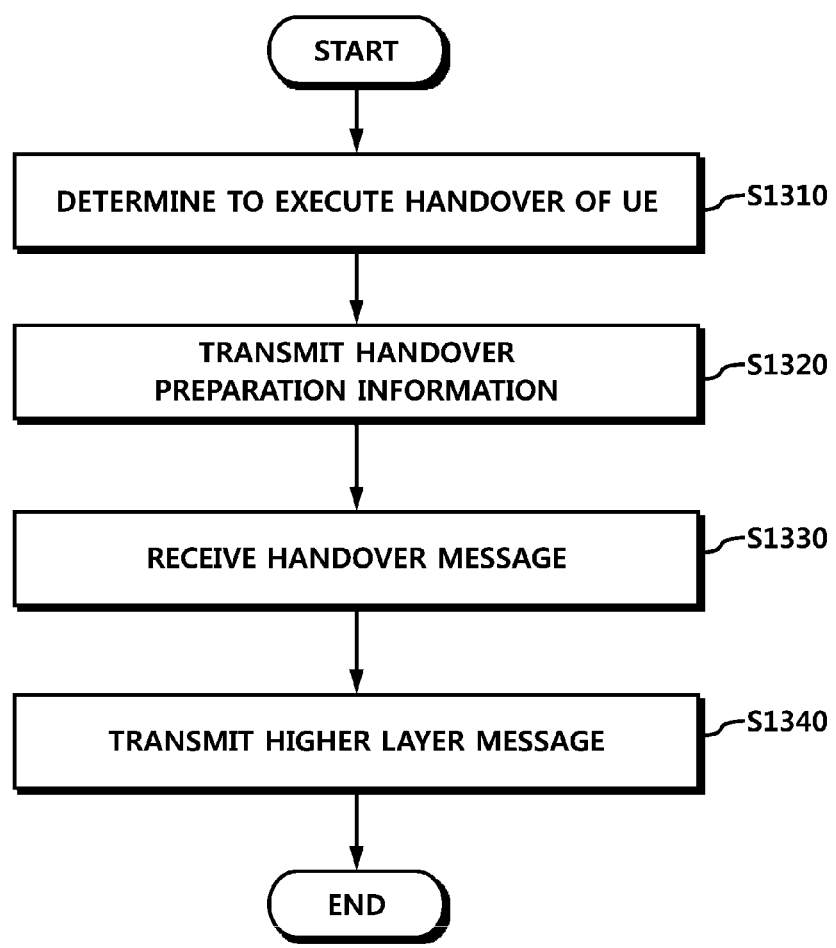
FIG. 13 is a diagram illustrating operations of a BS according to another embodiment of the present disclosure.

FIG. 13 is a diagram illustrating operations of a BS according to another embodiment of the present disclosure.

According to another embodiment of the present disclosure, the operations of the BS may include i) determining handover, ii) transmitting, to a target BS, handover preparation information including radio resource configuration information of a cell associated with a second BS, iii) receiving, from the target BS, a handover message including radio resource configuration information of a cell associated with the target BS, and iv) transmitting a higher layer message included in the handover message to a UE.

Referring to FIG. 13, the BS receives information such as a measurement report of the UE or the like and determines whether to execute handover in operation S1310.

When handover of the UE is determined, the BS transmits handover preparation information to the target BS, as a procedure of preparing the handover of the UE, in operation S1320.

The handover preparation information may include radio resource configuration information of the cell associated with the second BS with which the UE configures dual connectivity, and each embodiment thereof has been described with reference to FIG. 8 to FIG. 12.

According to another embodiment of the present disclosure, the radio resource configuration information of the cell associated with the second BS may include radio bearer configuration information associated with a radio bearer in the cell associated with the second BS or detailed configuration information of a radio bearer associated with the second BS.

Also, the radio resource configuration information of the cell associated with the second BS may include at least one piece of information from among second BS-associated cell index information (for example, an SCell index), a second BS cell identifier (for example, a PCI), and an index/identifier/indication information used for a UE to identify a second BS (or second BS cell) radio bearer.

Also, the radio bearer configuration information of the cell associated with the second BS or the detailed configuration information of the radio bearer associated with the second BS may be used for configuring a radio bearer of the cell associated with the second BS to be a radio bearer through a cell associated with the target BS.

Subsequently, the BS receives, from the target BS, a handover message including information required for executing handover of the UE, and the BS transmits the handover message transparently (without changing a value or contents) to the UE in operation S1330 and S1340.

The handover message received from the target BS may include information used for configuring the radio bearer of the cell associated with the second BS to be a radio bearer through the cell associated with the target BS.

Also, the higher layer message transmitted to the UE may include information used for configuring the radio bearer of the cell associated with the second BS to be a radio bearer through the cell associated with the target BS.

Particularly, the handover message to be used for the target BS to implement handover may include AS-Configuration to be used in the cell associated with the target BS through an RRC connection reconfiguration message. That is, the handover message may be transmitted by including the RRC connection reconfiguration message in a container, and the RRC connection reconfiguration message included in the handover message may include radio resource configuration information to be used in the cell associated with the target BS.

The RRC connection reconfiguration message used for handover may include mobilityControlInfo information.

mobilityControlInfo information may include a physical cell ID, a carrier frequency, an uplink/downlink bandwidth, C-RNTI information, or the like, of the cell associated with the target BS (for example, a target PCell).

The RRC connection reconfiguration message used for handover may include second BS-associated cell information (for example, sCellToAddModList or sCellToReleaseList). The second BS cell addition and modification information associated with the second BS may include second BS cell index/identifier/indication information for identifying the second BS.

Additionally/alternatively the RRC connection reconfiguration message used for handover may include radio resource configuration information including information associated with all bearers. That is, information for configuring all the bearers configured for the UE before handover to the target BS (or target BS cell) to be radio bearers of the cell associated with the target BS, as described in the following third embodiment, may be included.

As described in the following first or second embodiment, the radio bearer configuration information (for example, srb-ToAddModList, drb-ToAddModList) or detailed configuration information of a radio bearer of the RRC Connection Reconfiguration message, may include information indicating that a predetermined radio bearer is configured through the cell associated with the second BS (or the second BS). For example, a second BS-associated cell index (for example, an SCell index), a second BS cell identifier (for example, a PCI), or index/identifier/indication information used for a UE to identify a second BS cell (or second BS) radio bearer, may be included.

As another method, the RRC connection reconfiguration message may include indication information or timer information for continuously maintaining a predetermined radio bearer configured through a cell associated with a predetermined second BS.

As another method, the RRC connection reconfiguration message may include indication information or timer information for continuously maintaining a predetermined radio bearer configured through a cell associated with a predetermined second BS, during handover.

As another method, the RRC connection reconfiguration message may include indication information or timer information for maintaining an activated state of a cell associated with a second BS in which a predetermined radio bearer is configured, during handover.

As another method, the RRC connection reconfiguration message may include indication information or timer information for quickly changing, to an activated state, a state of a cell associated with a second BS in which a predetermined radio bearer is configured, during handover.

The descriptions have been described from the perspective of the operations of the BS (the first BS) according to each embodiment of the present disclosure.

Hereinafter, each embodiment of the present disclosure will be described from the perspective of the operations in which a UE having dual connectivity executes handover.

Figure 14:
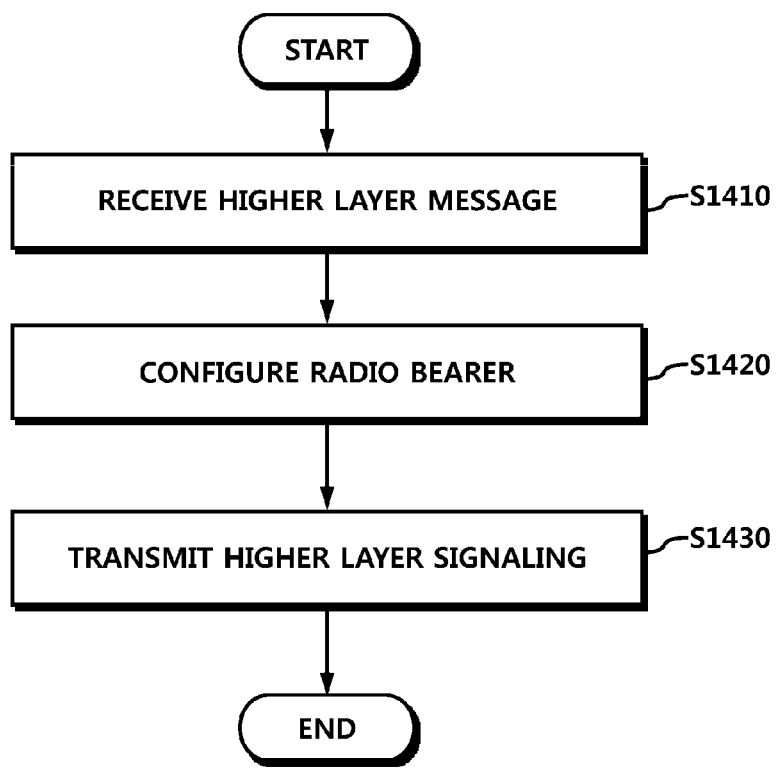
FIG. 14 is a diagram illustrating operations of a User Equipment (UE) according to another embodiment of the present disclosure.

FIG. 14 is a diagram illustrating operations of a UE according to another embodiment of the present disclosure.

According to another embodiment of the present disclosure, when a UE configuring dual connectivity with a first BS and a second BS executes handover, the operations of the UE may include i) receiving, from the first BS, a higher layer message for handover, ii) configuring a radio bearer of a cell associated with a target BS based on the higher layer message for handover, and iii) accessing the target BS through random access and transmitting, to the target BS, a higher layer signaling including handover complete information.

Also, according to another embodiment of the present disclosure, the higher layer message may include information for configuring a radio bearer of a cell associated with the second BS to be a radio bearer through a cell associated with the target BS.

Referring to FIG. 14, the UE configures dual connectivity with the first BS and the second BS. That is, the UE configures a plurality of connections with at least one cell associated with the first BS and at least one cell associated with the second BS, so as to transmit or receive data.

As the UE moves, the UE executes a handover procedure based on determination of the BS in association with handover.

The UE receives a higher layer message for handover, from the first BS in operation S1410. As described above, a handover message is generated by the target BS, and the generated handover message is transmitted to the first BS. The first BS transparently transmits a higher layer message included in the handover message to the UE.

The message used for the UE to execute handover may be received through a higher layer signaling. For example, the message may be received through an RRC connection reconfiguration message.

The higher layer message for handover may include information for configuring a radio bearer of a cell associated with the second BS before handover to be a radio bearer through the target BS, a cell associated with the target BS, or a target BS PCell. Also, it may include mobilityControlInfo information.

The UE receives the high layer message (RRC Connection Reconfiguration message including mobilityControlInfo) for handover and configures a radio bearer based on the higher layer message for handover, in operation S1420.

Subsequently, the UE executes a random access procedure for accessing the target BS and completes access and transmits a higher layer signaling including handover complete information to the target BS in operation S1430.

The higher layer signaling including the handover complete information may be, for example, an RRC connection reconfiguration complete message.

Hereinafter, the operations of a UE according to each embodiment, executed after receiving a higher layer message for handover from a first BS, will be described with reference to drawings.

First Embodiment

This is a method of a UE for transmitting traffic through a radio bearer configured in a cell associated with a second BS after completion of handover.

Figure 15:
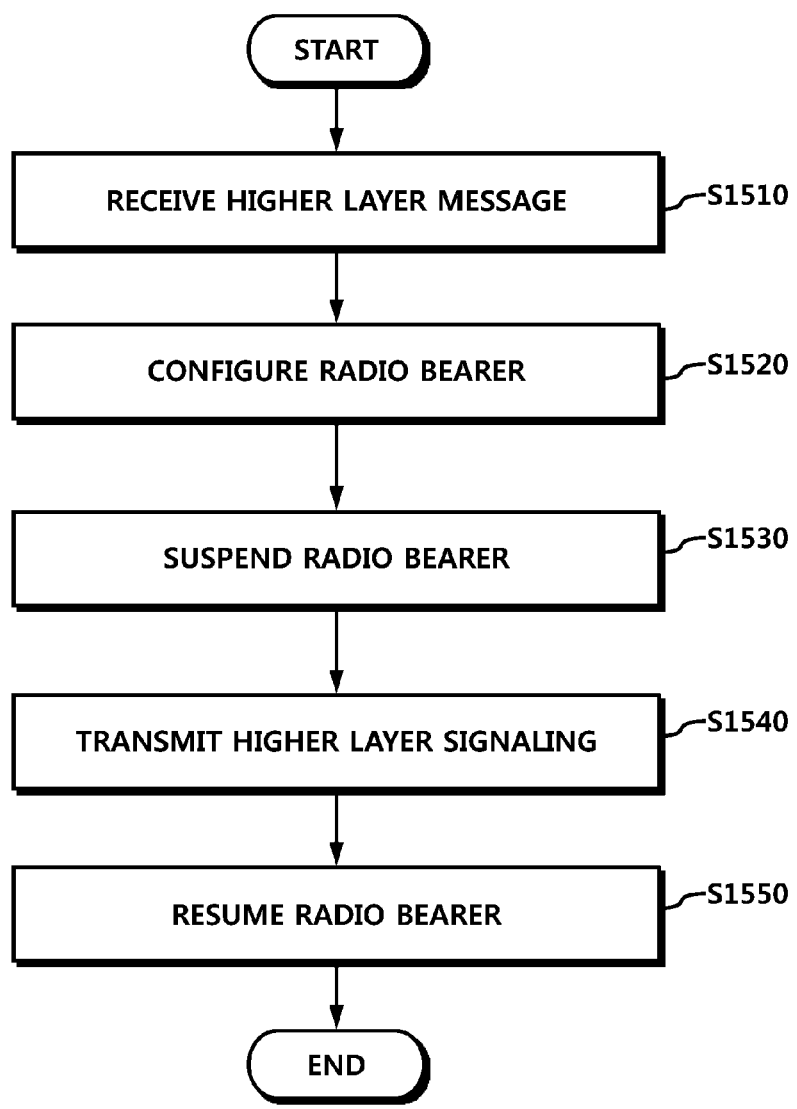
FIG. 15 is a diagram illustrating operations of a UE according to another embodiment of the present disclosure.

FIG. 15 is a diagram illustrating operations of a UE according to another embodiment of the present disclosure.

According to another embodiment of the present disclosure, when a UE configuring dual connectivity with a first BS and a second BS executes handover, the operations of the UE may include i) receiving, from the first BS, a higher layer message for handover, ii) configuring at least one radio bearer from among radio bearers of a cell associated with a target BS and a cell associated with the second BS based on the higher layer message, and iii) accessing the target BS through random access and transmitting, to the target BS, a higher layer signaling including handover complete information.

Also, according to another embodiment of the present disclosure, the operations of the UE may further include i) suspending the radio bearer of the cell associated with the second BS before transmitting the higher layer signaling, and ii) resuming the radio bearer of the cell associated with the second BS after transmitting the higher layer signaling. The UE buffers traffic through the cell associated with the second BS in the operation of suspending the radio bearer of the cell associated with the second BS. The UE activates the cell associated with the second BS so as to transmit the buffered traffic in the operation of resuming the radio bearer of the cell associated with the second BS.

Referring to FIG. 15, the UE receives a higher layer message for handover from the first BS, in operation S1510. The higher layer message for handover may include at least one piece of information from among second BS-associated addition and modification information, second BS cell index information, a second BS cell identifier, and index/identifier/indication information used for the UE to identify a second BS cell (or second BS) radio bearer. Also, the higher layer message for handover may include at least one piece of information from among indication information and timer information for maintaining a radio bearer configured through the cell associated with the second BS or activating the second BS cell.

The UE receives the higher layer message for handover and configures a radio bearer in operation S1520.

Particularly, when the UE receives a handover message, the UE executes synchronizing with a downlink of a cell associated with the target BS (PCell of the target BS). The UE resets a MAC. The UE reconfigures a PDCP with respect to all radio bearers (RBs). The UE reconfigures an RLC with respect to all radio bearers.

When the handover message includes cell addition information associated with the cell associated with the second BS (for example, sCellToAddModList), the UE may add the cell associated with the second BS.

The UE may configure the cell associated with the second BS to be deactivated in a lower layer.

When the handover message includes radio resource configuration (radioResourceConfigDedicated) information, the UE may execute a radio resource configuration procedure.

That is, when the received radio resource configuration (radioResourceConfigDedicated) information includes radio bearer information (for example, srb-ToAddModList, drb-ToAddModList), the UE may set and configure a PDCP entity based on the received pdcp-Config, may set and configure an RLC entity based on the received rlc-Config, and may configure a DTCH logical channel based on the received logicalChannelIdentity and logicalChannelConfig.

In this instance, the radio bearer information (for example, srb-ToAddModList, drb-ToAddModList) or detailed configuration information of a radio bearer may include information indicating that a predetermined radio bearer is configured through the cell associated with the second BS (or the second BS). For example, a second BS associated cell index (for example, an SCell index), a cell identifier (for example, a PCI), or an index used for a UE to identify a cell may be included.

The UE may suspend a predetermined radio bearer until handover is completed and the cell associated with the second BS where the predetermined radio bearer is configured is activated and may execute buffering traffic through the same in operation S1530.

The suspension of the radio bearer may be continued up to a timer included in the RRC Connection Reconfiguration message or up to a time configured by local configuration.

Alternatively, the suspension may be continued up to a time configured in advance through the RRC Connection Reconfiguration message or until the cell associated with the second BS is activated.

When the time is up, the UE may configure the predetermined radio bearer associated with the cell associated the second BS through a cell associated with the target BS (or another cell associated with the second BS) and transfer traffic in operation S1550.

The UE accesses the target BS through a random access procedure. The UE completes a handover procedure by successfully transmitting an RRC Connection Reconfiguration Complete message to the cell associated with the target BS, in operation S1540.

Subsequently, the target BS (or the second BS) may send an activation/deactivation MAC CE (control element) so as to activate a small cell that is configured through the cell associated with the second cell.

As described above, when the cell associated with the second BS is activated or the timer expires, the UE resumes the suspended radio bearer in operation S1550.

As another method, before receiving the RRC Connection Reconfiguration Complete message from the UE, the target BS (or the second BS) may send an activation/deactivation MAC CE (control element) so as to activate a small cell that is configured through the cell associated with the second cell.

In this instance, operation S1550 may be executed before operation S1540.

Second Embodiment

This is a method of a UE for maintaining a cell associated with a second BS as an activated state when receiving a message for handover.

Figure 16:
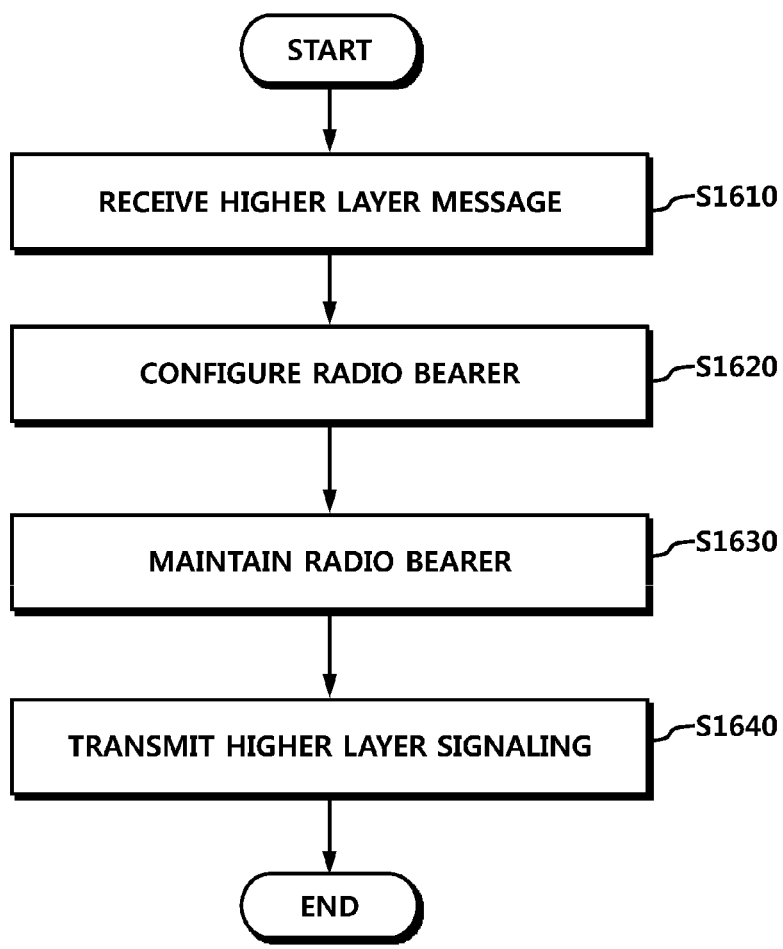
FIG. 16 is a diagram illustrating operations of a UE according to another embodiment of the present disclosure.

FIG. 16 is a diagram illustrating operations of a UE according to another embodiment of the present disclosure.

According to another embodiment of the present disclosure, when a UE configuring dual connectivity with a first BS and a second BS executes handover, the operations of the UE may include receiving, from the first BS, a higher layer message for handover, configuring at least one radio bearer from among radio bearers of a cell associated with a target BS and a cell associated with the second BS based on the higher layer message for handover, and accessing the target BS through random access and transmitting, to the target BS, a higher layer signaling including handover complete information.

Also, the method further includes controlling the cell associated with the second BS to be activated, based on indication information and timer information.

Referring to FIG. 16, the UE receives a handover message from the first BS in operation S1610. The handover message may include at least one piece of information from among second BS-associated addition and modification information, second BS cell index information, a second BS cell identifier, and index/identifier/indication information used for the UE to identify a second BS cell (or second BS) radio bearer. Also, the handover message may include at least one piece of information from among indication information and timer information for maintaining a radio bearer configured through the cell associated with the second BS or activating the second BS cell.

The UE that receives a higher layer message for handover configures a radio bearer in operation S1620.

Particularly, the UE may execute synchronizing with a downlink of a cell associated with the target BS. The UE resets a MAC. The UE reconfigures a PDCP with respect to all radio bearers (RBs). The UE reconfigures an RLC with respect to all radio bearers.

When the higher layer message for handover includes cell addition information associated with the second BS (for example, sCellToAddModList), the UE may add the cell associated with the second BS. The second BS cell addition information associated with the second BS may include second BS cell index/identifier/indication information for identifying the second BS cell.

The UE may configure the cell associated with the second BS to be deactivated in a lower layer.

Alternatively, the UE configures the cell associated with the second BS to be deactivated in the lower layer, and subsequently, may configure the cell associated with the second BS to be activated in the lower layer when the UE configures a radio bearer configured through the cell associated with the second BS based on the radio resource configuration (radioResourceConfigDedicated) information.

Alternatively, the UE adds the cell associated with the second BS and configures a radio bearer configured through the cell associated with the second BS so that the UE configures the cell associated with the second BS to be activated in the lower layer.

To this end, radio bearer information (for example, srb-ToAddModList, drb-ToAddModList) or detailed configuration information of a radio bearer of the higher layer message used for handover (for example, RRC connection reconfiguration message) may include information indicating that a predetermined radio bearer is configured through the cell associated with the second BS (or a predetermined second BS). For example, a second BS-associated cell index (for example, an SCell index), a second BS cell identifier (for example, a PCI), or an index used for a UE to identify a second BS cell (or a second BS) radio bearer, may be included.

As another method, the higher layer message used for handover (for example, RRC Connection Reconfiguration message) may include indication information or a timer for continuously maintaining a predetermined radio bearer configured in the first BS through the cell associated with the second BS.

As another method, the higher layer message used for handover (for example, RRC Connection Reconfiguration message) may include indication information or a timer for continuously maintaining a predetermined radio bearer configured in the first BS through the cell associated with the second BS, during handover.

As another method, the higher layer message used for handover (for example, RRC Connection Reconfiguration message) may include indication information or a timer for maintaining an activated state of the cell associated with the second BS in which a predetermined radio bearer is configured in the first BS, during handover.

When the higher layer message includes radio resource configuration (radioResourceConfigDedicated) information, the UE may execute a radio resource configuration procedure.

That is, when the received radio resource configuration (radioResourceConfigDedicated) information includes radio bearer information (for example, srb-ToAddModList, drb-ToAddModList), the UE may set and configure a PDCP entity based on the received pdcp-Config, and may set and configure an RLC entity based on the received rlc-ConFIG. Also, the UE may configure a DTCH logical channel based on the received logicalChannelIdentity and logicalChannelConFIG.

In this instance, the radio bearer information (for example, srb-ToAddModList, drb-ToAddModList) or detailed configuration information of a radio bearer may include information indicating that a predetermined radio bearer is configured through the cell associated with the second BS (or a predetermined second BS). For example, a second BS associated cell index (for example, an SCell index), a second BS cell identifier (for example, a PCI), or index/identifier/indication information used for a UE to identify a second BS cell (or a second BS cell).

As another method, when radio bearer information (for example, srb-ToAddModList, drb-ToAddModList) of the higher layer message (for example, an RRC connection reconfiguration message) includes information indicating that a predetermined radio bearer is configured through the cell associated with the second BS (or the second BS) (for example, a second BS-associated cell index (for example, an SCell index) or a second BS cell identifier (for example, a PCI) or index/identifier/indication information for a UE to identify a second BS cell (or second BS) radio bearer), or indication information or timer information for continuously maintaining a predetermined radio bearer configured in the first BS through a cell associated with a predetermined second BS, the UE may maintain radio resource configuration associated with the cell associated with the second BS. Alternatively, the UE may activate the cell associated with the second BS and maintain the radio resource configuration.

Through the above described method, the UE may maintain or activate a predetermined radio bearer of the cell associated with the second BS in operation S1630.

The UE accesses the target BS through a random access procedure. The UE transmits a higher layer signaling to the target BS and reports handover complete information in operation S1640.

The higher layer signaling may be, for example, an RRC connection reconfiguration complete message. The UE completes a handover procedure by successfully transmitting the higher layer signaling.

Third Embodiment

This is a method of completing handover by configuring a radio bearer through a cell associated with a target BS, and subsequently, configuring a radio bearer in a cell associated with a second BS.

Figure 17:
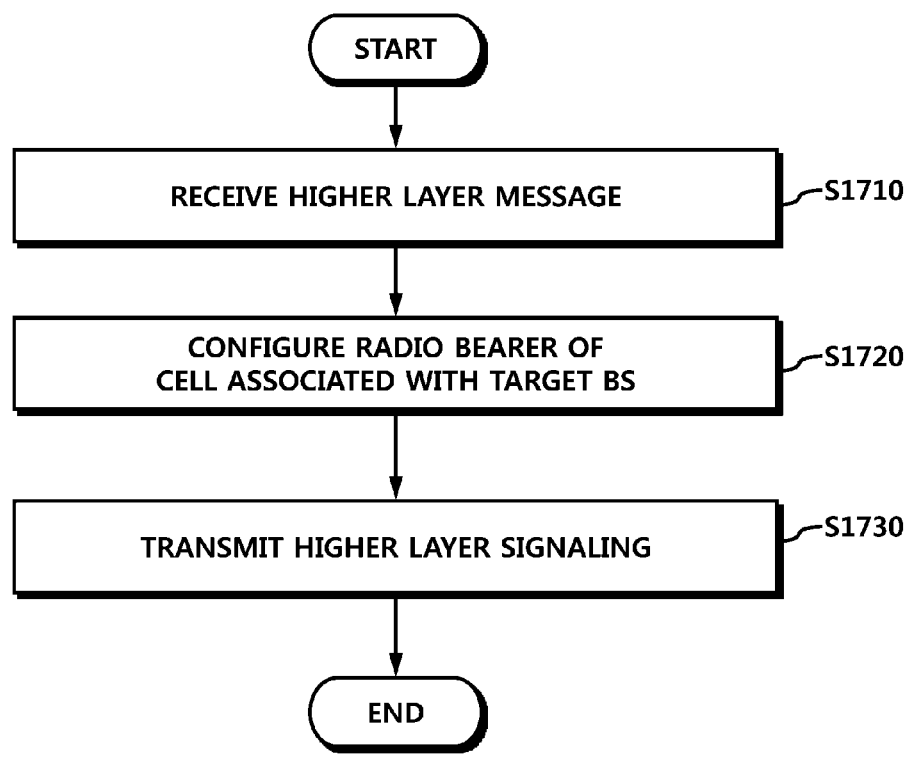
FIG. 17 is a diagram illustrating operations of a UE according to another embodiment of the present disclosure.

FIG. 17 is a diagram illustrating operations of a UE according to another embodiment of the present disclosure.

According to another embodiment of the present disclosure, when a UE configuring dual connectivity with a first BS and a second BS executes handover, the operations of the UE may include receiving, from the first BS, a handover message, configuring at least one radio bearer from among radio bearers of a cell associated with a target BS and a cell associated with the second BS based on the handover message, and accessing the target BS through random access and transmitting, to the target BS, a higher layer signaling including handover complete information.

Also, according to another embodiment of the present disclosure, the radio bearer configuring operation of the UE may configure only a radio bearer through the cell associated with the target BS, and may further includes configuring a radio bearer through the cell associated with the second BS after transmitting the higher layer signaling.

Referring to FIG. 17, the UE receives a higher layer message for handover from the first BS in operation S1610.

Subsequently, the UE configures a radio bearer of a cell associated with the target BS based on the higher layer message for handover, in operation S1720.

Particularly, the UE may execute synchronizing with a downlink of the target BS. The UE resets a MAC. The UE reconfigures a PDCP with respect to all radio bearers (RBs). The UE reconfigures an RLC with respect to all radio bearers.

When the higher layer message for handover includes cell addition information associated with the second BS (for example, sCellToAddModList), the UE may add the cell associated with the second BS.

The UE may configure the cell associated with the second BS to be deactivated in a lower layer.

When the higher layer message for handover includes radio resource configuration (radioResourceConfigDedicated) information, the UE may execute a radio resource configuration procedure.

That is, when the received radio resource configuration dedicated (radioResourceConfigDedicated) information includes radio bearer information (for example, srb-ToAddModList, drb-ToAddModList), the UE may set and configure a PDCP entity based on the received pdcp-Config, may set and configure an RLC entity based on the received rlc-Config, and may configure a DTCH logical channel based on the received logicalChannelIdentity and logicalChannelConFIG.

In this instance, the radio resource configuration information included in the handover message (for example, srb-ToAddModList or drb-ToAddModList) may not include information indicating that a predetermined bearer is configured through the cell associated with the second BS (or the second BS).

For example, a second BS associated cell index (for example, an SCell index), a second BS cell identifier (for example, a PCI), or index/identifier/indication information used for a UE to identify a second BS cell (or a second BS cell) radio bearer may not be included.

That is, signaling radio bearer configuration information may include radio bearer configuration information (srb-Identity, rlc-Config, logicalChannelConfig) associated with a radio bearer configured through a target, and data radio bearer configuration information may include information configured through the target BS (eps-BearerIdentity, drb-Identity, rlc-Config, logical ChannelIdentity, logicalChannelConfig). Accordingly, information for configuring a radio bearer of the cell associated with the second BS before handover to be a radio bearer through the target BS, a cell associated with the target BS, or a target BS PCell may be included. Therefore, the radio bearer of the cell associated with the second BS is configured through the cell associated with the target BS in operation S1720.

The UE accesses the target BS through a random access procedure. The UE completes a handover procedure by successfully transmitting a higher layer signaling (for example, an RRC Connection Reconfiguration Complete message) to the target BS, in operation S1730.

Subsequently, the target BS may configure a radio bearer through the cell associated with the second BS using a new RRC Connection Reconfiguration message. To this end, a procedure for adding/modifying a second BS or a second BS cell may be initiated, or information received through the first BS may be used.

As another method, radio resource configuration (radioResourceConfigDedicated) included in the higher layer message for handover may include information indicating that a predetermined radio bearer is configured through the cell associated with the second BS (or the second BS) through the radio bearer information (for example, srb-ToAddModList, drb-ToAddModList). For example, a second BS associated cell index (for example, an SCell index), a second BS cell identifier (for example, a PCI), or index/identifier/indication information used for a UE to identify a second BS cell (or a second BS cell), may be included therein.

Also, the radio resource configuration (radioResourceConfigDedicated) included in the higher layer message for handover may include information indicating that a predetermined radio bearer is configured through a cell associated with a predetermined second BS (or a predetermined second BS), through the radio bearer information (srb-ToAddModList, drb-ToAddModList) or detailed configuration information of a radio bearer, or may include radio bearer configuration information when a predetermined radio bearer of the cell associated with the second BS is configured through a cell associated with the target BS through the radio bearer configuration information (for example, srb-ToAddModList or drb-ToAddModList). For example, information for configuring a radio bearer of the cell associated with the second BS before handover to be a radio bearer through the target BS, the cell associated with the target BS, or a target BS PCell, may be included therein.

The UE configures a radio resource with respect to all radio bearers in the cell associated with the target BS, based on radio resource configuration (radioResourceConfigDedicated) information included in the higher layer message for handover, in operation S1720. For example, the UE may configure a radio bearer of a cell associated with the first BS and/or a radio bearer of the cell associated with the second BS before handover, to be a radio bearer through the target BS, the cell associated with the target BS, or the target BS PCell.

The UE accesses the target BS through a random access procedure. The UE completes a handover procedure by successfully transmitting a higher layer signaling (for example, an RRC Connection Reconfiguration Complete message) to the target BS, in operation S1730.

Subsequently, the UE may configure a radio bearer through the cell associated with the second BS, as described above.

The operations of the UE and the BS in each embodiment of the present disclosure have been described. The configurations of the UE and the BS that may execute the operations of each embodiment, which have been described with reference to FIG. 5 to FIG. 17, will be briefly described.

Figure 18:
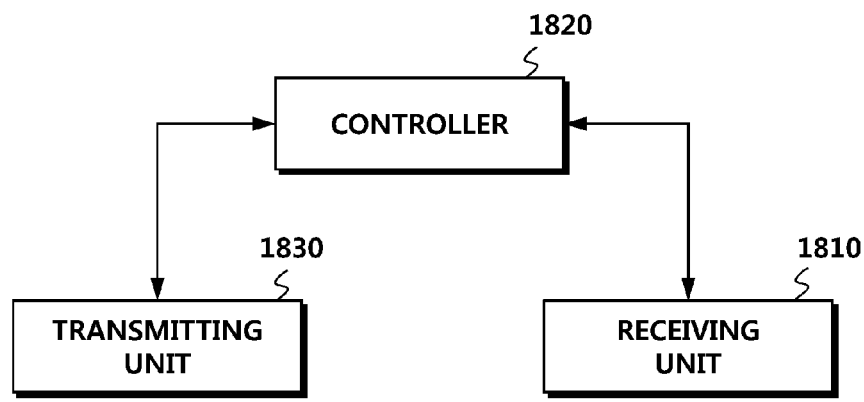
FIG. 18 is a diagram illustrating a configuration of a UE according to another embodiment of the present disclosure.

FIG. 18 is a block diagram illustrating a configuration of a UE according to another embodiment of the present disclosure.

Referring to FIG. 18, a UE 1800 according to another embodiment may include a receiving unit 1810, a controller 1820, and a transmitting unit 1830.

According to another embodiment of the present disclosure, the UE configuring dual connectivity with a first BS and a second BS executes handover may include the receiving unit 1810, configured to receive, from the first BS, a handover message, the controller 1820 configured to configure a radio bearer of a cell associated with a target BS based on a higher layer message for handover, and the transmitting unit 1830 configured to access the target BS through random access, and to transmit, to the target BS, a higher layer signaling including handover complete information.

Also, the higher layer message for handover may include information used for configuring a radio bearer of a cell associated with the second BS to be a radio bearer through the cell associated with the target BS.

The receiving unit 1810 may receive, from the first BS, the second BS, and the target BS, downlink control information, data, a message, through a corresponding channel.

The transmitting unit 1830 may transmit, to the first BS, the second BS, and the target BS, uplink control information, data, a message, through a corresponding channel.

The UE 1800 includes all configurations for implementing the above described operations of the UE.

Figure 19:
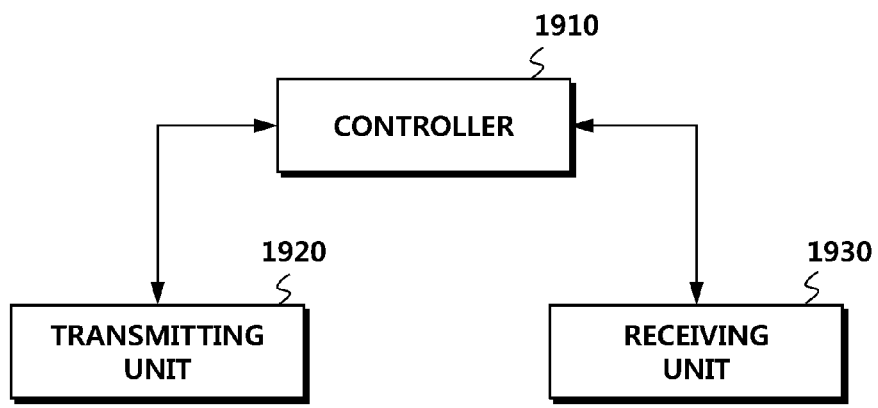
FIG. 19 is a diagram illustrating a configuration of a BS according to another embodiment of the present disclosure.

FIG. 19 is a block diagram illustrating a configuration of a BS according to another embodiment of the present disclosure.

Referring to FIG. 19, a BS 1900, according to another embodiment of the present disclosure, includes a controller 1910, a transmitting unit 1920, and a receiving unit 1930.

According to another embodiment of the present disclosure, a first BS controlling handover of a UE configuring dual connectivity with a second BS includes the controller 1910 configured to determine handover of the UE, the transmitting unit 1920 configured to transmit, to a target BS, handover preparation information including radio resource configuration information of a cell associated with the second BS, the receiving unit 1930 configured to receive, from the target BS a handover message including radio resource configuration information of the target BS, and the transmitting unit 1920 configured to transmit a higher layer message included in the handover message to the UE.

According to another embodiment of the present disclosure, the radio resource configuration information of the cell associated with the second BS may include radio bearer configuration information associated with a radio bearer in the cell associated with the second BS or detailed configuration information of a radio bearer.

Also, according to another embodiment of the present disclosure, the radio resource configuration information of the cell associated with the second BS may include at least one piece of information from among second BS-associated cell index information, a second BS cell identifier, and index/identifier/indication information used for the UE to identify a second BS cell (or second BS) radio bearer.

Also, the radio bearer configuration information of the cell associated with the second BS or the detailed configuration information of the radio bearer associated with the second BS may be used for configuring the radio bearer of the cell associated with the second BS to be a radio bearer through a cell associated with the target BS.

Also, the higher layer message for handover may include information used for configuring the radio bearer of the cell associated with the second BS to be a radio bearer through the cell associated with the target BS.

The controller 1910 may control general operations of the BS (the first BS) needed for controlling handover of a UE having dual connectivity, which is required for implementing the present disclosure according to the above described embodiments.

The transmitting unit 1920 may transmit the handover preparation information to the target BS, and may transmit the handover message to the UE.

The receiving unit 1930 may be used for transmitting or receiving a signal, a message, or data required for implementing the above described present disclosure, to/from the UE.

Each information field described in the above descriptions is merely an example, and the name and expression of each information field may be differently expressed. Therefore, information transmitted or received among the UE, the first BS, the second BS, and the target BS may be transmitted by being included in various information fields.

As described in the descriptions, the present disclosure enables a UE that is simultaneously connected with a macro cell and a small cell to use a radio bearer configured in a small cell along with handover, through the small cell under a control of the macro cell or cooperation between the macro cell and the small cell, in an environment in which the macro cell and the small cell are configured by individual BSs through a non-ideal backhaul.

According to the present disclosure, there are provided a method and apparatus for a UE that configures dual connectivity with a plurality of BSs, to process a radio bearer configured in a small cell, as handover is executed.

Also, the present disclosure provides a method and apparatus for the UE to provide, through a target BS, a radio bearer configured in a small cell, even after executing handover.

Although a preferred embodiment of the present disclosure has been described for illustrative purposes, those skilled in the art will appreciate that various modifications, additions and substitutions are possible, without departing from the scope and spirit of the invention as disclosed in the accompanying claims. Therefore, the embodiments disclosed in the present disclosure are intended to illustrate the scope of the technical idea of the present disclosure, and the scope of the present disclosure is not limited by the embodiment. The scope of the present disclosure shall be construed on the basis of the accompanying claims in such a manner that all of the technical ideas included within the scope equivalent to the claims belong to the present disclosure.

The invention claimed is:

1. A method of a first Base Station (BS) for controlling handover of a User Equipment (UE) that configures dual connectivity, the method comprising:
    determining handover of the UE;
    transmitting, to a target BS, handover preparation information including radio resource configuration information of a cell associated with a second BS;
    receiving, from the target BS, a handover message including radio resource configuration information of a cell associated with the target BS; and
    transmitting, to the UE, a higher layer message including the handover message,
    wherein the radio resource configuration information of the cell associated with the second BS includes radio bearer configuration information of the cell associated with the second BS; and
    wherein the higher layer message transmitted to the UE includes information for configuring a radio bearer of the cell associated with the second BS to be a radio bearer of the cell associated with the target BS.

2. The method as claimed in claim 1, wherein the radio resource configuration information of the cell associated with the second BS is included in AS configuration (AS-Config) information.

3. The method as claimed in claim 1, wherein the radio resource configuration information of the cell associated with the second BS includes detailed configuration information of a radio bearer associated with the second BS.

4. The method as claimed in claim 3, wherein one of the radio bearer configuration information of the cell associated with the second BS and the detailed configuration information of the radio bearer associated with the second BS includes at least one piece of information from among second BS cell index information, a second BS cell identifier, and information used for the UE to identify a second BS cell radio bearer or a second BS radio bearer.

5. The method as claimed in claim 3, wherein one of the radio bearer configuration information of the cell associated with the second BS and the detailed configuration information of the radio bearer associated with the second BS is information for configuring a radio bearer of the cell associated with the second BS to be a radio bearer through the cell associated with the target BS.

6. The method as claimed in claim 1, wherein the handover message includes information for configuring a radio bearer of the cell associated with the second BS to be a radio bearer of the cell associated with the target BS.

7. A method of a User Equipment (UE) for performing handover when the UE configures dual connectivity with a first Base Station (BS) and a second BS, the method comprising:
receiving, from the first BS, a higher layer message for handover;
configuring a radio bearer of a cell associated with a target BS based on the higher layer message; and
accessing the target BS through random access and transmitting, to the target BS, a higher layer signaling including handover complete information,
wherein the higher layer message includes information for configuring a radio bearer of a cell associated with the second BS to be the radio bearer through the cell associated with the target BS.

8. The method as claimed in claim 7, further comprising:
after transmitting the higher layer signaling to the target BS, receiving a higher layer signaling for configuring a radio bearer of a cell associated with the second BS; and
configuring the radio bearer of the cell associated with the second BS based on the received higher layer signaling.

9. A first Base Station (BS) for controlling handover of a User Equipment (UE) that configures dual connectivity, the BS comprising:
a controller configured to determine handover of the UE;
a transmitting unit configured to transmit, to a target BS, handover preparation information including radio resource configuration information of a cell associated with a second BS; and
a receiving unit configured to receive, from the target BS, a handover message including radio resource configuration information of a cell associated with the target BS,
wherein the transmitting unit transmits, to the UE, a higher layer message including the handover message;
wherein the radio resource configuration information of the cell associated with the second BS includes radio bearer configuration information of the cell associated with the second BS; and
wherein the higher layer message transmitted to the UE includes information for configuring a radio bearer of the cell associated with the second BS to be a radio bearer of the cell associated with the target BS.

10. The first BS as claimed in claim 9, wherein the radio resource configuration information of the cell associated with the second BS is included in AS configuration (AS-Config) information.

11. The first BS as claimed in claim 9, wherein the radio resource configuration information of the cell associated with the second BS includes detailed configuration information of a radio bearer associated with the second BS.

12. The first BS as claimed in claim 11, wherein one of the radio bearer configuration information of the cell associated with the second BS and the detailed configuration information of the radio bearer associated with the second BS is information for configuring the radio bearer of the cell associated with the second BS to be a radio bearer through the cell associated with the target BS.

13. The first BS as claimed in claim 11, wherein one of the radio bearer configuration information of the cell associated with the second BS and the detailed configuration information of the radio bearer associated with the second BS includes at least one piece of information from among second BS cell index information, a second BS cell identifier, and information used for the UE to identify a second BS cell radio bearer or a second BS radio bearer.

14. The first BS as claimed in claim 9, wherein the handover message includes information for configuring a radio bearer of the cell associated with the second BS to be a radio bearer of the cell associated with the target BS.

* * * * *